US012634990B2

(12) United States Patent
Chen et al.

(10) Patent No.: US 12,634,990 B2
(45) Date of Patent: May 19, 2026

(54) RECEIVER-ASSISTED LISTEN-BEFORE-TALK PROCEDURES WITH EXPLICIT BEAM INDICATION

(71) Applicant: QUALCOMM Incorporated, San Diego, CA (US)

(72) Inventors: Siyi Chen, Beijing (CN); Giovanni Chisci, San Diego, CA (US); Arumugam Chendamarai Kannan, San Diego, CA (US); Vinay Chande, San Diego, CA (US); Jing Sun, San Diego, CA (US); Xiaoxia Zhang, San Diego, CA (US); Shaozhen Guo, Beijing (CN); Changlong Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 18/282,987

(22) PCT Filed: Apr. 12, 2021

(86) PCT No.: PCT/CN2021/086568
§ 371 (c)(1),
(2) Date: Sep. 19, 2023

(87) PCT Pub. No.: WO2022/217422
PCT Pub. Date: Oct. 20, 2022

(65) Prior Publication Data
US 2024/0155681 A1 May 9, 2024

(51) Int. Cl.
*H04W 74/0816* (2024.01)
*H04B 7/06* (2006.01)
(Continued)

(52) U.S. Cl.
CPC .... *H04W 74/0816* (2013.01); *H04B 7/06966* (2023.05); *H04L 1/0003* (2013.01);
(Continued)

(58) Field of Classification Search
None
See application file for complete search history.

(56) References Cited

U.S. PATENT DOCUMENTS 10,863,542 B2 * 12/2020 Sun ................... H04W 74/0816
2021/0153245 A1 5/2021 Tooher et al.
(Continued)

FOREIGN PATENT DOCUMENTS

CN        111699748 A    9/2020
WO        2019060307     3/2019
WO        2019210185 A1  10/2019

OTHER PUBLICATIONS

International Search Report and Written Opinion—PCT/CN2021/086568—ISA/EPO—Jan. 13, 2022.
(Continued)

*Primary Examiner* — Lonnie V Sweet
(74) *Attorney, Agent, or Firm* — ArentFox Schiff, LLP and Qualcomm

(57) ABSTRACT

Example aspects include a method, apparatus, and computer-readable medium for wireless communication at user equipment of a mobile network, comprising receiving, from a base station via a first beam, a pre-grant message requesting the UE to perform a listen-before-talk (LBT) procedure on a second beam. The aspects further include performing, according to the pre-grant message, the LBT procedure on the second beam. Additionally, the aspects include indicating, to the base station, whether the LBT procedure was successful.

20 Claims, 10 Drawing Sheets

(51) Int. Cl.

| | |
|---|---|
| *H04L 1/00* | (2006.01) |
| *H04L 5/00* | (2006.01) |
| *H04W 72/1268* | (2023.01) |
| *H04W 74/08* | (2024.01) |
| *H04W 76/20* | (2018.01) |

(52) U.S. Cl.
CPC ....... *H04L 5/0051* (2013.01); *H04W 72/1268* (2013.01); *H04W 74/0866* (2013.01); *H04W 76/20* (2018.02)

(56) References Cited

U.S. PATENT DOCUMENTS

| | | | | |
|---|---|---|---|---|
| 2022/0287093 | A1* | 9/2022 | Iyer | H04W 74/0808 |
| 2023/0101279 | A1* | 3/2023 | Niu | H04L 5/0094 |
| | | | | 370/329 |
| 2023/0397250 | A1* | 12/2023 | Zhang | H04W 72/046 |
| 2024/0188128 | A1* | 6/2024 | Cao | H04B 7/06968 |

OTHER PUBLICATIONS

Samsung: "Channel Access Procedures for NR-U", 3GPP TSG-RAN WG1 Meeting #99, 3GPP Draft, R1-1912449, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, pp. 1-13, Nov. 8, 2019 (Nov. 8, 2019), XP051823426, p. 2, Sections 1-7, The whole document.

* cited by examiner

500

600

700

900

Receiving, from a base station via a first beam, a pre-grant message requesting the UE to perform a listen-before-talk (LBT) procedure on a second beam 902

Performing, according to the pre-grant message, the LBT procedure on the second beam 904

Indicating, to the base station, whether the LBT procedure was successful 906

1100

Sending, to a user equipment (UE) via a first beam, a pre-grant message requesting the UE to perform a listen-before-talk (LBT) procedure on a second beam    1102

Obtaining, from the UE, an indication of whether the LBT procedure was successful    1104

Sending, to the UE in response to the indication indicating that the LBT procedure being successful, downlink data via the second beam    1106

RECEIVER-ASSISTED LISTEN-BEFORE-TALK PROCEDURES WITH EXPLICIT BEAM INDICATION

CROSS-REFERENCE TO RELATED APPLICATION

This application is a 35 U.S.C. § 371 National Phase of International Patent Application No. PCT/CN2021/086568, titled "RECEIVER-ASSISTED LISTEN-BEFORE-TALK PROCEDURES WITH EXPLICIT BEAM INDICATION", filed on Apr. 12, 2021, which is incorporated herein by reference in its entirety.

BACKGROUND

Technical Field

The described aspects relate generally to wireless communication systems, and more particularly, to apparatuses and methods for performing receiver-assisted listen-before-talk (LBT) procedures.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G NR. 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology.

In particular, wireless communication systems may include procedures for sharing spectrum (e.g., bandwidth, resources) for transmissions in unlicensed bands. Such procedures may typically comprise a transmitting device attempting to detect energy (e.g., potential interference) on the wireless medium prior to transmission. Under certain channel conditions, the transmitting device may fail to detect interference in an environment proximate to a receiving device, and as a result, the receiving device may fail to receive a transmission from the transmitting device. Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and non-transitory computer-readable mediums for wireless communication are disclosed by the present disclosure.

An example aspect includes a method of wireless communication at a user equipment (UE) of a mobile network, comprising receiving, from a base station via a first beam, a pre-grant message requesting the UE to perform a listen-before-talk (LBT) procedure on a second beam. The method further includes performing, according to the pre-grant message, the LBT procedure on the second beam. Additionally, the method further includes indicating, to the base station, whether the LBT procedure was successful.

Another example aspect includes an apparatus of wireless communication at a UE of a mobile network, network, comprising a non-transitory memory storing computer-executable instructions, and a processor communicatively coupled with the non-transitory memory. The processor is configured to execute the computer-executable instructions to receive, from a base station via a first beam, a pre-grant message requesting the UE to perform a LBT procedure on a second beam. The processor is further configured to execute the computer-executable instructions to perform, according to the pre-grant message, the LBT procedure on the second beam. Additionally, the processor is further configured to execute the computer-executable instructions to indicate, to the base station, whether the LBT procedure was successful.

Another example aspect includes an apparatus of wireless communication at a UE of a mobile network, comprising means for receiving, from a base station via a first beam, a pre-grant message requesting the UE to perform a LBT procedure on a second beam. The apparatus further includes means for performing, according to the pre-grant message, the LBT procedure on the second beam. Additionally, the apparatus further includes means for indicating, to the base station, whether the LBT procedure was successful.

Another example aspect includes a non-transitory computer-readable medium comprising stored computer-executable instructions for wireless communication by a UE of a mobile network, executable by a processor to receive, from a base station via a first beam, a pre-grant message requesting the UE to perform a LBT procedure on a second beam. The computer-executable instructions are further executable to perform, according to the pre-grant message, the LBT procedure on the second beam. Additionally, the computer-executable instructions are further executable to indicate, to the base station, whether the LBT procedure was successful.

Another example aspect includes a method of wireless communication at a base station of a mobile network, comprising sending, to a UE via a first beam, a pre-grant message requesting the UE to perform a LBT procedure on a second beam. The method further includes obtaining, from the UE, an indication of whether the LBT procedure was successful. Additionally, the method further includes sending, to the UE in response to the indication indicating that the LBT procedure being successful, downlink data via the second beam.

Another example aspect includes an apparatus of wireless communication at a base station of a mobile network, network, comprising a non-transitory memory storing computer-executable instructions, and a processor communicatively coupled with the non-transitory memory. The processor is configured to execute the computer-executable instructions to send, to a UE via a first beam, a pre-grant message requesting to the UE perform a LBT procedure on a second beam. The processor is further configured to execute the computer-executable instructions to obtain, from the UE, an indication of whether the LBT procedure was successful. Additionally, the processor is further configured to execute the computer-executable instructions to send, to the UE in response to the indication indicating that the LBT procedure being successful, downlink data via the second beam.

Another example aspect includes an apparatus of wireless communication at a base station of a mobile network, comprising means for sending, to a UE via a first beam, a pre-grant message requesting the UE to perform a LBT procedure on a second beam. The apparatus further includes means for obtaining, from the UE, an indication of whether the LBT procedure was successful. Additionally, the apparatus further includes means for sending, to the UE in response to the indication indicating that the LBT procedure being successful, downlink data via the second beam.

Another example aspect includes a non-transitory computer-readable medium comprising stored computer-executable instructions for wireless communication by a base station of a mobile network, executable by a processor to send, to a UE via a first beam, a pre-grant message requesting the UE to perform a LBT procedure on a second beam. The computer-executable instructions are further executable to obtain, from the UE, an indication of whether the LBT procedure was successful. Additionally, the computer-executable instructions are further executable to send, to the UE in response to the indication indicating that the LBT procedure being successful, downlink data via the second beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
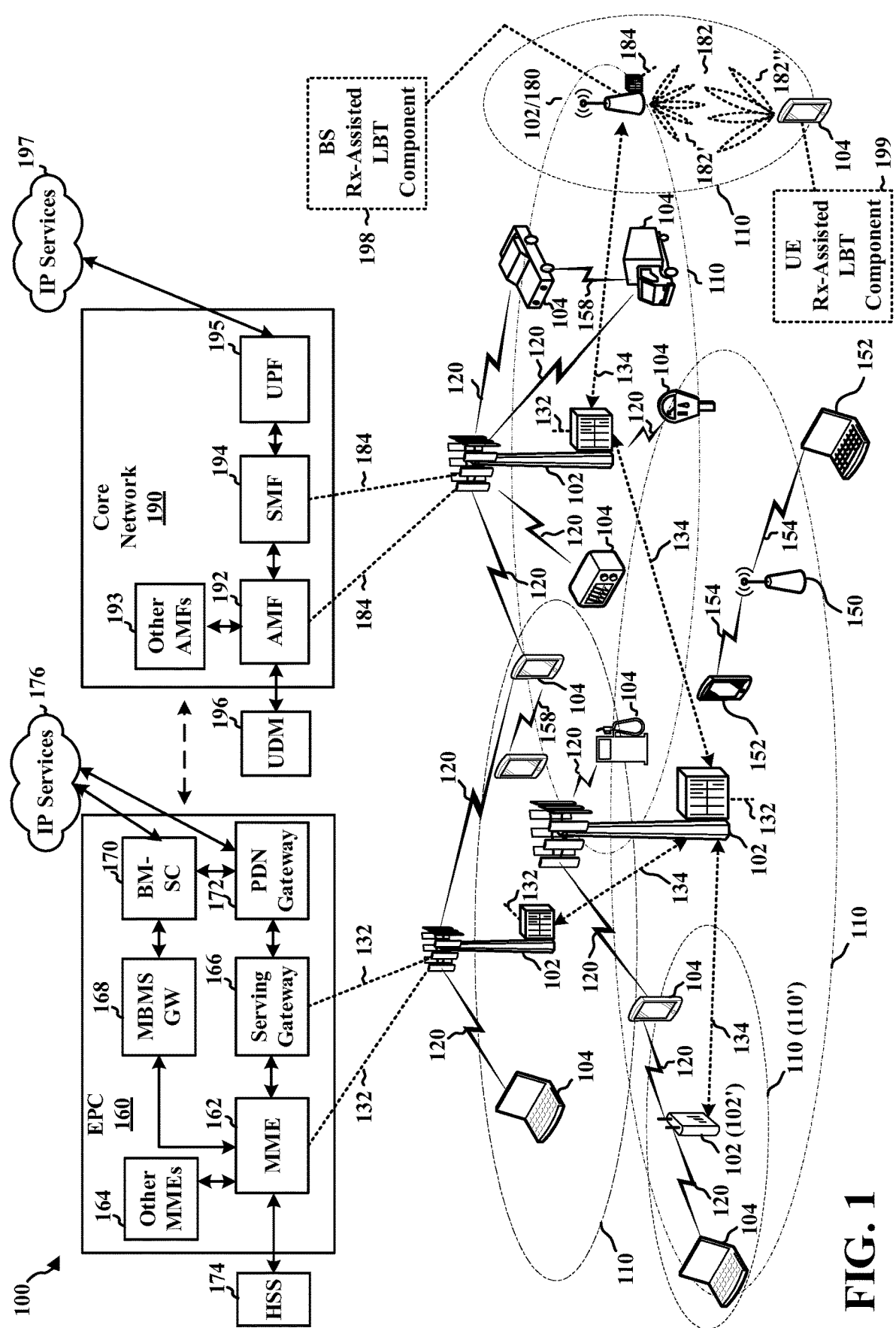
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conventional wireless communication systems may supplement a cellular licensed band with other unlicensed bands as appreciable amounts of bandwidth on the cellular licensed bands may be consumed. For example, at least portions of transmissions intended for the cellular licensed bands may be offloaded to an unlicensed band, which may already be populated by Wi-Fi and/or other similar wireless telecommunications deployments. That is, conventional wireless communication systems may have a need to share unlicensed spectrum with other wireless communication systems in a manner that allows both wireless communication systems to coexist. Listen-Before-Talk (LBT) is a spectrum sharing mechanism by which a wireless device may detect energy (e.g., potential interference) in an unlicensed channel prior to a transmission on the unlicensed channel. LBT may include performing a clear channel assessment (CCA) prior to attempting a transmission on the unlicensed channel.

Conventionally, LBT and CCA procedures may be performed by transmitting devices, as the transmitting device may be aware of the need for the transmission. That is, the transmitting device may perform CCA to detect energy (e.g., potential interference) in the wireless channel. However, interference may not be uniform along the wireless channel due to, for example, differences in geographical position, obstructions or blockages, attenuation, delay, fading, and other factors. As a result, the transmitting device may be able to detect interference proximate to the transmitting device, but such an interference determination may not be an applicable and/or accurate representation of the interference proximate to the receiving device. Moreover, these deficiencies may be made more prevalent by the use beamforming techniques. That is, the directionality of the beams used by the transmitting device and the receiving device may further degrade the applicability and/or accuracy of the use of the interference proximate to the transmitting device as a measure of the interference proximate to the receiving device.

Aspects presented herein provide for multiple manners for a transmitting device to instruct a receiving device to perform LBT procedures on a specified beam by the receiving device. In some aspects, the receiving device may perform the LBT procedures on the specified beam to detect interference proximate to the receiving device, and may indicate the results (e.g., success or failure) of the LBT procedure to the transmitting device. Further, aspects presented herein may improve reliability of the LBT procedure and facilitate transmissions in the unlicensed bands when compared to a conventional wireless communication system.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communication system and an access network 100. The wireless communication system 100 (also referred to as a wireless wide area network (WWAN)) includes base stations 102, UEs 104, an Evolved Packet Core (EPC) 160, and another core network 190 (e.g., a 5G Core (5GC)).

In certain aspects, the UE 104 may include a UE receiver (Rx)-assisted LBT component 199. The UE Rx-assisted LBT component 199 may be configured to perform an LBT procedure on a particular beam response to receiving a pre-grant message from the base station 102, and to indicate the results of the LBT procedure to the base station 102. For example, the UE Rx-assisted LBT component 199 may be configured to receive, via a first beam, a pre-grant message requesting the UE to perform a LBT procedure on a second beam, perform the LBT procedure on the second beam, and indicate whether the LBT procedure was successful.

Similarly, the base stations 102 may include a base station (BS) Rx-assisted LBT component 198. The BS Rx-assisted LBT component 198 may be configured to instruct the UE 104 to perform an LBT procedure on a particular beam and to send downlink data in response to an indication that the LBT procedure was successful. For example, the base station 102 may be configured to send, via a first beam, a pre-grant message requesting the UE to perform a LBT procedure on a second beam, obtain an indication of whether the LBT procedure was successful, and send, in response to the indication indicating that the LBT procedure being successful, downlink data via the second beam.

The base stations 102 may include macrocells (high power cellular base station) and/or small cells (low power cellular base station). The macrocells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102 and/or UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communication system 100 may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152 and/or the AP 150 may perform an LBT procedure (e.g., CCA, eCCA) prior to communicating in order to determine whether the channel is available.

A base station 102, whether a small cell 102' or a large cell (e.g., macro base station), may include an evolved Node B (eNB), gNodeB (gNB), or other type of base station. Some base stations, such as gNB 180 may operate in one or more frequency bands within the electromagnetic spectrum.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180 and/or the UE 104 may perform beam training to determine the best receive and transmit directions for each of the base station 180 and/or the UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on sidelink, V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet Protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may provide examples for communication in connection with 5G NR, the concepts described herein may be applicable to other similar areas, such as LTE, LTE-A, CDMA, GSM, and other wireless technologies.

Referring to FIGS. 2A-2D, the diagrams illustrate examples of different resources that may be used for communications between network elements (e.g., base station 102, UE 104) of the wireless communication system and the access network 100 described above in FIG. 1. The resources may be time-based, frequency-based, or both on time and frequency.

Figures 2A, 2B, 2C, 2D:
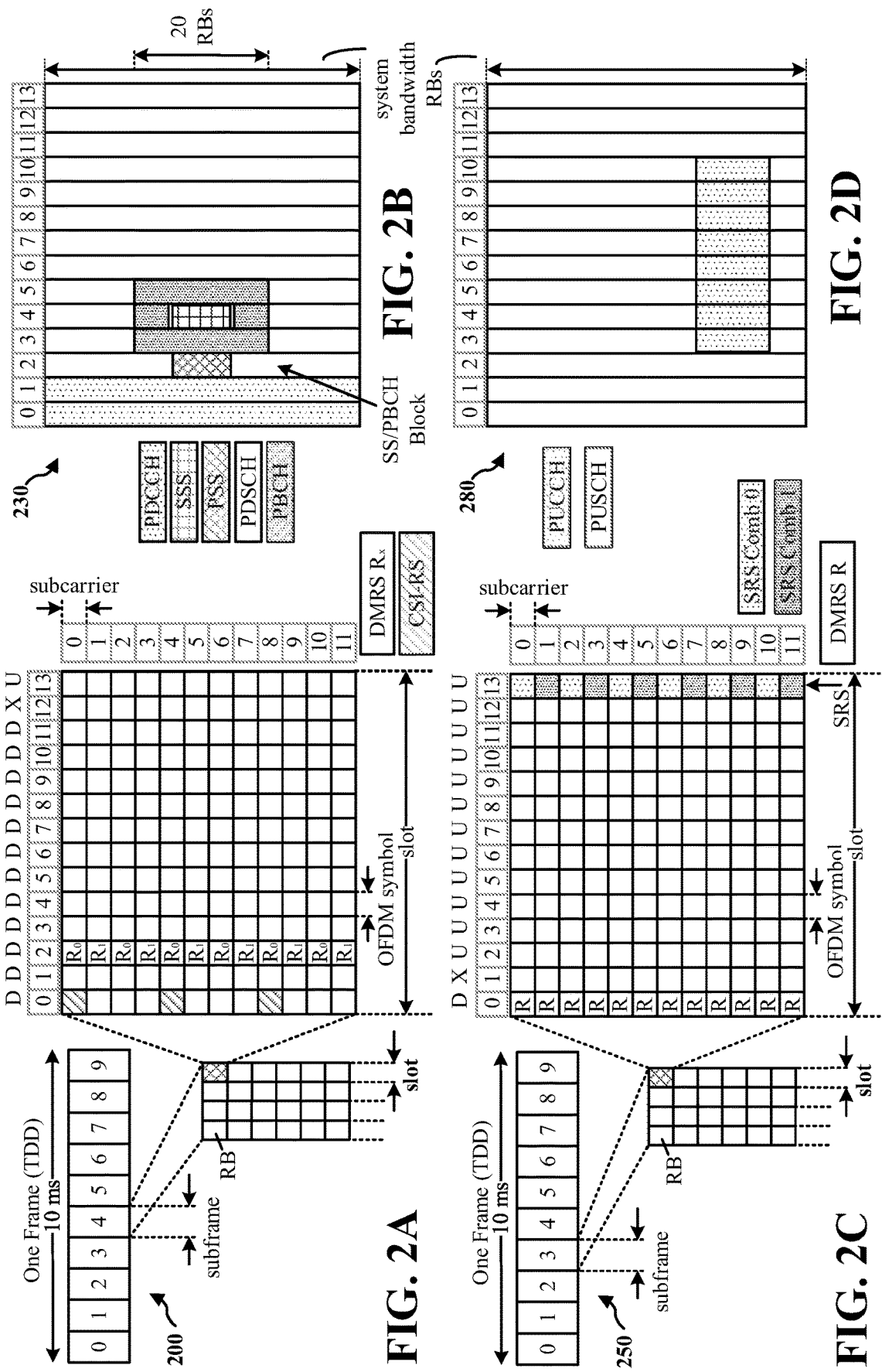
FIG. 2A is a diagram illustrating an example of a first frame, in accordance with various aspects of the present disclosure.
FIG. 2B is a diagram illustrating an example of downlink channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink channels within a subframe, in accordance with various aspects of the present disclosure.

FIG. 2A is a diagram 20/0 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 1 (with mostly uplink). While subframes 3, 4 are shown with slot formats 1, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (e.g., 10 milliseconds) may be divided into 10 equally sized subframes (e.g., 1 millisecond). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) OFDM (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and 2 slots/subframe. The subcarrier spacing and symbol length/duration are a function of the numerology. The subcarrier spacing may be equal to 2*15 kHz, where p is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. In such an example, the slot duration may be 0.25 milliseconds, the subcarrier spacing may be 60 kHz, and the symbol duration may be approximately 16.67 microseconds (s). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various downlink channels within a subframe of a frame. The physical downlink control channel (PDCCH) carries DCI within one or more control channel elements (CCEs) (e.g., 1, 2, 4, 8, 16, or 32 CCEs), each CCE including nine RE groups (REGs), each REG including four consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The terms SSB and SS/PBCH may be used interchangeably. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE 104 may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE 104 may transmit sounding reference signals (SRS). The SRS may be transmitted in the last symbol of a subframe. The SRS may have a comb structure, and a UE 104 may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
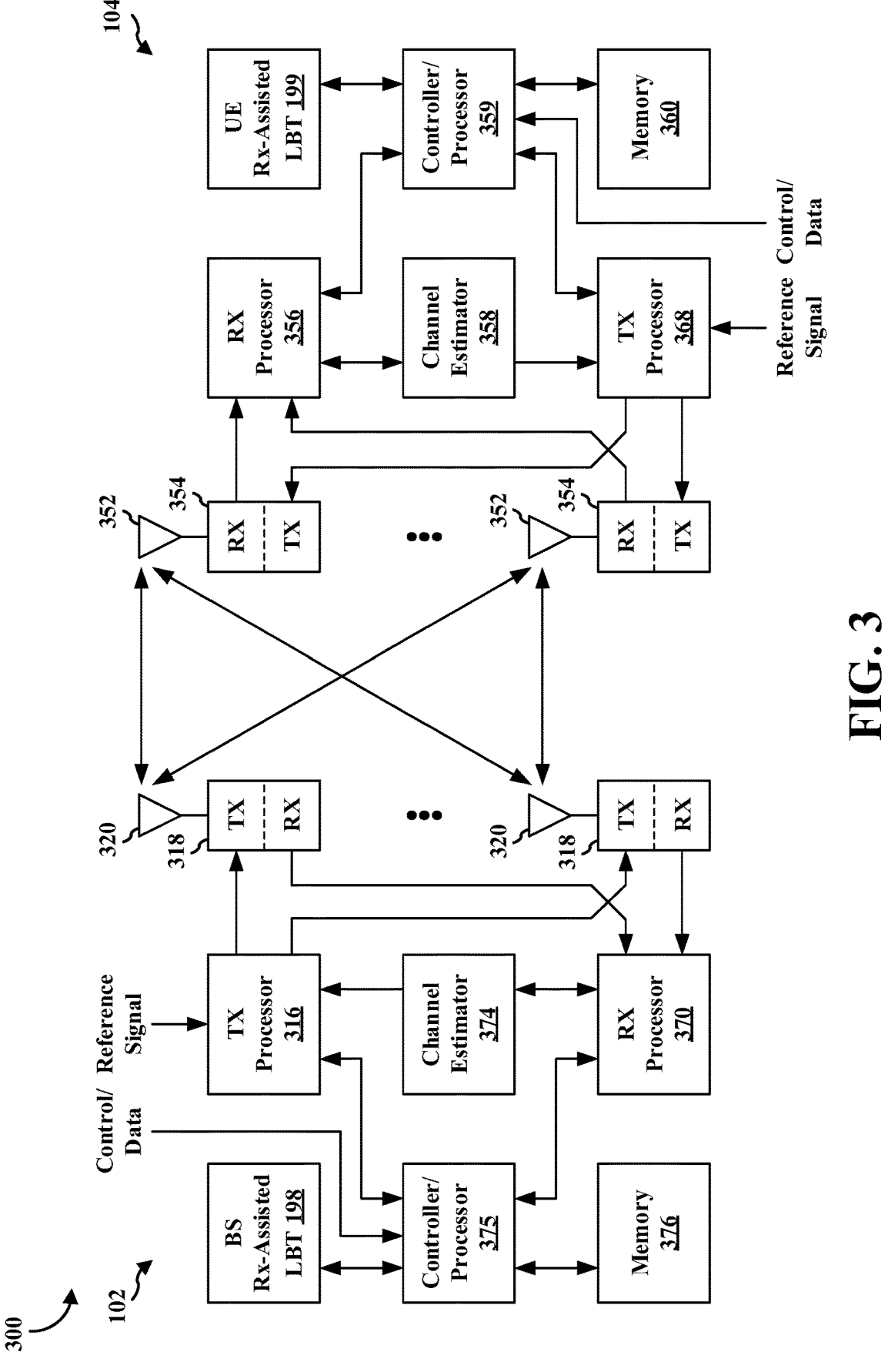
FIG. 3 is a diagram illustrating an example of hardware components of the base station and the UE in the access network, in accordance with various aspects of the present disclosure.

FIG. 3 is a block diagram 300 of example hardware components of a base station 102 in communication with a UE 104 in an access network. In the downlink, IP packets from the EPC 160 may be provided to a controller/processor 375. The controller/processor 375 may implement Layer 3 and/or Layer 2 functionality. Layer 3 may include a radio resource control (RRC) layer, and Layer 2 may include a service data adaptation protocol (SDAP) layer, a packet data convergence protocol (PDCP) layer, a radio link control (RLC) layer, and a medium access control (MAC) layer. The controller/processor 375 may provide RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 may implement Layer 1 functionality associated with various signal processing functions. Layer 1, which may include a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 may handle mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream may be spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX may receive a signal through its respective antenna 352. Each receiver 354RX may recover information modulated onto an RF carrier and may provide the information to the receive (RX) processor 356. The TX processor 368 and the RX processor 356 may implement Layer 1 functionality associated with various signal processing functions. The RX processor 356 may perform spatial processing on the information to recover any spatial streams destined for the UE 104. If or when multiple spatial streams are destined for the UE 104, the multiple spatial streams may be combined by the RX processor 356 into a single OFDM symbol stream. The RX processor 356 may then convert the OFDM symbol stream from the time-domain to the frequency domain using a Fast Fourier Transform (FFT). The frequency domain signal may comprises a separate OFDM symbol stream for each subcarrier of the OFDM signal. The symbols on each subcarrier, and the reference signal, may be recovered and demodulated by determining the most likely signal constellation points transmitted by base station 102. These soft decisions may be based on channel estimates computed by the channel estimator 358. The soft decisions may then be decoded and deinterleaved to recover the data and control signals that were originally transmitted by the base station 102 on the physical channel. The data and control signals may then be provided to the controller/processor 359, which may implement Layer 3 and Layer 2 functionality.

The controller/processor 359 can be associated with a memory 360 that stores program codes and data. The memory 360 may be referred to as a non-transitory computer-readable medium. The controller/processor 359 may provide demultiplexing between transport and logical channels, packet reassembly, deciphering, header decompression, and control signal processing to recover IP packets from the EPC 160. The controller/processor 359 is also responsible for error detection using an acknowledge (ACK) and/or negative acknowledge (NACK) protocol to support HARQ operations.

Similar to the functionality described in connection with the transmission by base station 102, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission may be processed at the base station 102 in a manner similar to that described in connection with the receiver function at the UE 104. Each receiver 318RX may receive a signal through its respective antenna 320. Each receiver 318RX may recover information modulated onto an RF carrier and may provide the information to a RX processor 370.

The controller/processor 375 may be associated with, and coupled with, a memory 376 that stores program codes and data. The memory 376 may be referred to as a non-transitory computer-readable medium. The controller/processor 375 may provide demultiplexing between transport and logical channels, packet reassembly, deciphering, header decompression, control signal processing to recover IP packets from the UE 104. IP packets from the controller/processor 375 may be provided to the EPC 160. The controller/processor 375 may also be responsible for error detection using an ACK and/or NACK protocol to support HARQ operations.

In some aspects, the base station 102 may comprise a BS Rx-assisted LBT component 198. The BS Rx-assisted LBT component 198 may be configured to send, to a UE 104 via a first beam, a pre-grant message requesting the UE to perform a LBT procedure on a second beam. The BS Rx-assisted LBT component 198 may be further configured to obtain, from the UE, an indication of whether the LBT procedure was successful. Alternatively or additionally, the BS Rx-assisted LBT component 198 may be configured to send, to the UE in response to the indication indicating that the LBT procedure being successful, downlink data via the second beam.

In other aspects, at least one of the TX processor 316, the RX processor 370, and the controller/processor 375 may be configured to perform aspects in connection with the BS Rx-assisted LBT component 198 of FIG. 1. For example, the memory 376 may store computer-executable instructions defining the BS Rx-assisted LBT component 198. In other aspects, the TX processor 316, the RX processor 370, and/or the controller/processor 375 may be configured to execute the BS Rx-assisted LBT component 198.

In some aspects, the UE 104 may comprise a UE Rx-assisted LBT component 199. The UE Rx-assisted LBT component 199 may be configured to receive, from a base station via a first beam, a pre-grant message requesting the UE to perform a LBT procedure on a second beam. The UE Rx-assisted LBT component 199 may be further configured to perform, according to the pre-grant message, the LBT procedure on the second beam. Alternatively or additionally, the UE Rx-assisted LBT component 199 may be configured to indicate, to the base station, whether the LBT procedure was successful.

In other aspects, at least one of the TX processor 368, the RX processor 356, and the controller/processor 359 may be configured to perform aspects in connection with the UE Rx-assisted LBT component 199 of FIG. 1. For example, the memory 360 may store computer-executable instructions defining the UE Rx-assisted LBT component 199. In other aspects, the TX processor 368, the RX processor 356, and/or the controller/processor 359 may be configured to execute the UE Rx-assisted LBT component 199.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with enhanced mobile broadband (eMBB), massive machine type communications (mMTC), and ultra-reliable low latency communications (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

The LBT procedures such as those implemented by conventional wireless communication systems may provide a mechanism by which a transmitting device may perform a CCA detection prior to using a wireless channel, typically an unlicensed wireless channel. That is, the transmitting device may perform channel (e.g., spectrum) sensing for a certain period, which may generally be referred to as a CCA period. The transmitting device performing the CCA may use energy detection (ED) to determine the presence (i.e., the wireless channel is busy) and/or absence (i.e., the wireless channel is idle) of other dominating signals on the wireless channel. If or when the energy detected during an initial CCA period does not exceed (i.e., is lower than) a certain ED threshold (i.e., channel is idle), the transmitting device may access the wireless channel for a predetermined period. The predetermined period may generally be referred to as a channel occupancy time (COT). Alternatively or additionally, if or when the energy detected during an initial CCA period exceeds (i.e., is greater than or equal to) the ED threshold (i.e., channel is busy), an extended CCA (eCCA) period may start, during which the detected energy may again be compared against the ED threshold until channel access is granted. In some aspects, the ED threshold may be predefined by one or more regulations and/or standards (e.g., 3GPP and/or 802.11 standards). The eCCA period may be determined by a contention window (CW) measured as a number of time slots and/or symbols. For example, the eCCA period may not be permitted to exceed the length of the contention window.

Referring to Table 1, the LBT procedures may be categorized into one of four schemes. As shown in Table 1, Cat1 LBT may refer to performing transmissions without sensing the channel beforehand (i.e., immediate transmission). In some aspects, the transmission under Cat1 LBT may start after a short switching gap (e.g., 16 microseconds (μsec)). Cat2 LBT may refer to LBT procedures without a random back-off in which the CCA period is fixed (e.g., 16 μsec, 25 μsec). That is, the time duration that the wireless channel is sensed to be idle before the transmission may be deterministic (i.e., fixed). Cat3 LBT may refer to LBT procedures with random back-off and a contention window of fixed size, in which the extended CCA period may be drawn by a random number within the fixed contention window. Cat4

LBT may refer to LBT procedures with random back-off and a contention window of variable size. That is, the extended CCA period may be drawn by a random number within the contention window, whose size may vary based on channel dynamics.

TABLE 1

| LBT Categories | |
| --- | --- |
| Category | Description |
| 1 | Immediate transmission (i.e., no LBT) |
| 2 | LBT without random back-off |
| 3 | LBT with random back-off and fixed contention window |
| 4 | LBT with random back-off and variable contention window |

Conventionally, LBT and CCA procedures may be performed by transmitting devices, as the transmitting device may be aware of the need for the transmission. That is, the transmitting device may perform CCA to detect energy (e.g., potential interference) in the wireless channel. However, interference may not be uniform along the wireless channel due to, for example, differences in geographical position, obstructions or blockages, attenuation, delay, fading, and other factors. As a result, the transmitting device may be able to detect interference proximate to the transmitting device, but such an interference determination may not be an applicable and/or accurate representation of the interference proximate to the receiving device.

For example, transmitter-based CCA detections may suffer from various problems due to the differences between the channel conditions proximate to the transmitting device and the channel conditions proximate to the receiving device. One such problem may be referred to as a "hidden node" problem that may arise if or when a transmitting device may not detect a transmission in the channel that negatively impacts the ability of the receiving device to receive the transmission from the transmitting device. Another such problem may be referred to as an "exposed node" problem that may arise if or when a channel appears to be busy (e.g., a transmission was detected) to the transmitting device and the receiving device may have been able to receive the transmission from the transmitting device without causing a collision with the detected transmission.

As such, LBT procedures in which CCA detections are performed by the receiving device may be preferable over conventional CCA detections performed by the transmitting device, since Rx-assisted LBT procedures may reduce the probability of inapplicable and/or inaccurate interference determinations (e.g., hidden node and exposed node problems). Thus, Rx-assisted LBT procedures may improve reliability of the LBT procedures and facilitate transmissions in the unlicensed bands when compared to a conventional wireless communication system.

Figures 4A, 4B:
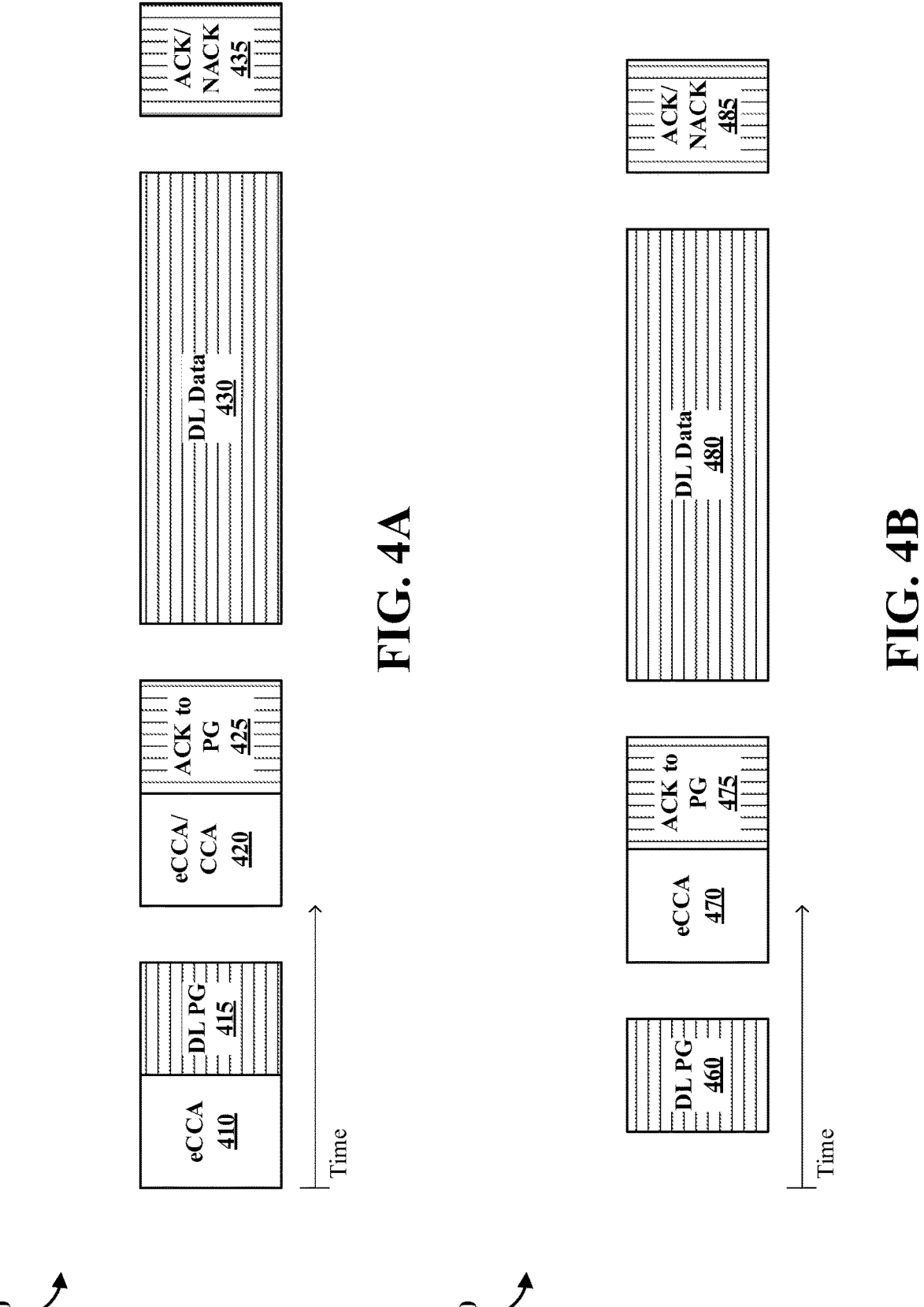
FIG. 4A is a diagram illustrating an example of a Category 4 receiver (Rx)-assisted listen-before-talk (LBT) procedure between a base station and a UE in an access network, in accordance with various aspects of the present disclosure.
FIG. 4B is a diagram illustrating an example of a Category 2 Rx-assisted LBT procedure between a base station and a UE in an access network, in accordance with various aspects of the present disclosure.

FIG. 4A is a diagram illustrating an example of a Category 4 Rx-assisted LBT procedure 400 between a base station 102 (e.g., gNB) and a UE 104 in an access network (e.g., access network 100). The base station 102 and the UE 104 may be configured to communicate on a wireless channel, which may be in an unlicensed spectrum. For example, the wireless channel may be in a 60 GHz band. As the wireless channel may be in an unlicensed spectrum, the base station 102 and the UE 104 may be configured to perform a LBT procedure to determine whether the wireless channel is idle prior to performing transmissions on the channel. Alternatively or additionally, the use of LBT may be mandated by regulations of the geographic regions (e.g., Europe, Japan) in which the base station 102 and the UE 104 may be located.

At 410, the base station 102 may initiate a Cat4 LBT procedure to obtain a COT for downlink transmissions. The base station 102 may perform eCCA detection to determine whether the wireless channel is idle (e.g., open) proximate to the base station 102. If or when the eCCA at 410 is successful (e.g., indicates that the wireless channel is idle), the base station 102 may, at 415, send a downlink pre-grant (DL PG) message to the UE 104. The DL PG message may comprise control information for the UE 104. Alternatively or additionally, the DL PG message may instruct the UE 104 to perform a CCA or eCCA detection on the wireless channel.

The UE 104 may perform the CCA or the eCCA in response to receiving the DL PG message, at 420. For example, the UE 104 may use ED to determine the presence (i.e., the wireless channel is busy) and/or absence (i.e., the wireless channel is idle) of other dominating signals on the wireless channel proximate to the UE 104. The UE 104 may compare the energy detected during the CCA period or the eCCA period to the ED threshold to determine whether or not the wireless channel is idle (e.g., open).

In some aspects, the UE 104 may determine an interference level based on measuring the energy detected on the wireless channel. For example, the UE 104 may quantize the energy measurement based on a comparison of the energy measurement to the ED threshold. That is, if or when the energy measurement satisfies (e.g., is greater than or equal to) the ED threshold, the UE 104 may determine that the interference level of the quantized energy measurement is "busy." Alternatively or additionally, if or when the energy measurement fails to satisfy (e.g., is less than) the ED threshold, the UE 104 may determine that the interference level of the quantized energy measurement is "idle."

In other optional or additional aspects, the UE 104 may determine the interference level based on a comparison of the energy measurement to a plurality of thresholds. The plurality of thresholds may include the ED threshold and at least one other threshold lower than the ED threshold. For example, if or when the energy measurement satisfies the other threshold but fails to satisfy the ED threshold, the UE 104 may determine that the interference level of the quantized energy measurement is "medium" (but still idle/open). Alternatively or additionally, if or when the energy measurement fails to satisfy the other threshold (and therefore also fails to satisfy the ED threshold), the UE 104 may determine that the interference level of the quantized energy measurement is "idle." Alternatively or additionally, if or when the energy measurement satisfies the ED threshold, the UE 104 may determine that the interference level of the quantized energy measurement is "busy."

At 425, the UE 104 may send an acknowledgement (e.g., ACK) to the DL PG message (APG) to the base station 102. The APG may indicate whether the CCA and/or eCCA procedure was successful (i.e., channel is idle) or was not successful (i.e., channel is busy). In some aspects, the APG may comprise an indication of the interference level determined by the UE 104. In other optional or additional aspects, the UE 104 may refrain from sending the acknowledgment as an indication that the CCA and/or eCCA procedure was not successful (i.e., channel is busy).

In response to receiving the acknowledgement from the UE 104, at 430, the base station 102 may configure and send at least a portion of the data to be transmitted to the UE 104. For example, the base station 102 may configure a modulation scheme, a coding rate, and other similar parameters for transmitting the data to the UE 104 over the unlicensed wireless channel. The base station 102 may send the data to the UE 104 during the COT allocated according to the CCA or the eCCA performed by the UE 104. The base station 102 may configure the transmission parameters based on the interference level indicated by the APG.

In other optional or additional aspects, the base station 102 may, at 430, refrain from transmitting the data in response to an indication from the UE 104 that the CCA and/or eCCA was not successful (e.g., channel is busy) and/or a lack of a response that the CCA and/or eCCA was successful (e.g., channel is idle). In such aspects, the base station 102 may back off (e.g., for the duration of a back off timer) from data transmission and wait for the wireless channel to become idle, at which point the base station 102 may retry another data burst. Alternatively or additionally, the base station 102 may configure transmission of at least a portion of a data burst according to a relatively high level of interference. For example, the base station 102 may configure the transmission with a duration limitation, a different modulation scheme suitable for a high interference environment, a different coding rate suitable for a high interference environment, among others. The base station 102 may send the data with the modified configuration if or when the wireless channel becomes idle.

The UE 104 may receive the data from the base station 102, and in response, the UE 104 may generate and send an acknowledgement (e.g., ACK) or a negative acknowledgement (e.g., NACK) indicating whether or not the data was received and successfully decoded, at 435. That is, the UE 104 may generate and send an ACK to the base station 102 if or when the UE 104 received and successfully decoded the data sent by the base station 102 at 430. Alternatively or additionally, the UE 104 may generate and send a NACK to the base station 102 if or when the UE 104 did not successfully receive and/or decode the data sent by the base station 102 at 430. In some aspects, the UE 104 may refrain from sending an ACK and/or a NACK to the base station 102, as an indication that the UE 104 received and successfully decoded the data sent by the base station 102 at 430.

FIG. 4B is a diagram illustrating an example of a Category 2 Rx-assisted LBT procedure 450 between a base station 102 (e.g., gNB) and a UE 104 in an access network (e.g., access network 100). The base station 102 and the UE 104 may be configured to communicate on a wireless channel, which may be in an unlicensed spectrum. For example, the wireless channel may be in a 60 GHz band. As the wireless channel may be in an unlicensed spectrum, the base station 102 and the UE 104 may be configured to perform a LBT procedure to determine whether the wireless channel is idle prior to performing transmissions on the channel. Alternatively or additionally, the use of LBT may be mandated by regulations of the geographic regions (e.g., Europe, Japan) in which the base station 102 and the UE 104 may be located.

At 460, the base station 102 may initiate a Cat2 LBT procedure to obtain a COT for downlink transmissions. In some aspects, the base station 102 may send a DL PG message to the UE 104 without having performed a prior CCA detection. That is, the DL PG message at 460 may be considered a short control signaling transmission, and as such, may not be required to be sent subsequent to a CCA/eCCA detection. The PG message may comprise control information for the UE 104. Alternatively or additionally, the DL PG message may instruct the UE 104 to perform a eCCA (or CCA) detection on the wireless channel.

The UE 104 may perform the eCCA in response to receiving the DL PG message, at 470. For example, the UE 104 may use ED to determine the presence (i.e., the wireless channel is busy) and/or absence (i.e., the wireless channel is idle) of other dominating signals on the wireless channel proximate to the UE 104. The UE 104 may compare the energy detected during the eCCA period to the ED threshold to determine whether or not the wireless channel is idle (e.g., open).

In some aspects, the UE 104 may determine an interference level based on measuring the energy detected on the wireless channel. For example, the UE 104 may quantize the energy measurement based on a comparison of the energy measurement to the ED threshold. That is, if or when the energy measurement satisfies (e.g., is greater than or equal to) the ED threshold, the UE 104 may determine that the interference level of the quantized energy measurement is "busy." Alternatively or additionally, if or when the energy measurement fails to satisfy (e.g., is less than) the ED threshold, the UE 104 may determine that the interference level of the quantized energy measurement is "idle."

In other optional or additional aspects, the UE 104 may determine the interference level based on a comparison of the energy measurement to a plurality of thresholds. The plurality of thresholds may include the ED threshold and at least one other threshold lower than the ED threshold. For example, if or when the energy measurement satisfies the other threshold but fails to satisfy the ED threshold, the UE 104 may determine that the interference level of the quantized energy measurement is "medium" (but still idle/open). Alternatively or additionally, if or when the energy measurement fails to satisfy the other threshold (and therefore also fails to satisfy the ED threshold), the UE 104 may determine that the interference level of the quantized energy measurement is "idle." Alternatively or additionally, if or when the energy measurement satisfies the ED threshold, the UE 104 may determine that the interference level of the quantized energy measurement is "busy."

At 475, the UE 104 may send an APG to the base station 102. The APG may indicate whether the eCCA procedure was successful (i.e., channel is idle) or not successful (i.e., channel is busy). In some aspects, the acknowledgment may comprise an indication of the interference level determined by the UE 104. In other optional or additional aspects, the UE 104 may refrain from sending the acknowledgment as an indication that the eCCA procedure was not successful (i.e., channel is busy).

In response to receiving the acknowledgement from the UE 104, at 480, the base station 102 may configure and send at least a portion of the data to be transmitted to the UE 104. For example, the base station 102 may configure a modulation scheme, a coding rate, and other similar parameters for transmitting the data to the UE 104 over the unlicensed wireless channel. The base station 102 may send the data to the UE 104 during the COT allocated according to the CCA or the eCCA performed by the UE 104. The base station 102 may configure the transmission parameters based on the interference level indicated by the APG.

In other optional or additional aspects, the base station 102 may, at 480, refrain from transmitting the data in response to an indication from the UE 104 that the CCA and/or eCCA was not successful (e.g., channel is busy) and/or a lack of a response that the CCA and/or eCCA was successful (e.g., channel is idle). In such aspects, the base station 102 may back off (e.g., for the duration of a back off timer) from data transmission and wait for the wireless channel to become idle, at which point the base station 102 may retry another data burst. Alternatively or additionally, the base station 102 may configure transmission of at least a portion of a data burst according to a relatively high level of interference. For example, the base station 102 may configure the transmission with a duration limitation, a different modulation scheme suitable for a high interference environment, a different coding rate suitable for a high interference environment, among others. The base station 102 may send the data with the modified configuration if or when the wireless channel becomes idle.

The UE 104 may receive the data from the base station 102, and in response, the UE 104 may generate and send an acknowledgement (e.g., ACK) or a negative acknowledgement (e.g., NACK) indicating whether or not the data was received and successfully decoded, at 485. That is, the UE 104 may generate and send an ACK to the base station 102 if or when the UE 104 received and successfully decoded the data sent by the base station 102 at 480. Alternatively or additionally, the UE 104 may generate and send a NACK to the base station 102 if or when the UE 104 did not successfully receive and/or decode the data sent by the base station 102 at 480. In some aspects, the UE 104 may refrain from sending an ACK and/or a NACK to the base station 102, as an indication that the UE 104 received and successfully decoded the data sent by the base station 102 at 430.

In some aspects, a Rx-Assisted LBT procedure initiated by the base station 102 to obtain an uplink COT (not shown) may be performed in a manner similar to a conventional LBT procedure. That is, in such an LBT procedure, the base station 102 both performs the CCA and acts as the receiving device in the procedure (e.g., receives uplink data from the UE 104). Thus, in such a scenario, the LBT procedure may have a low probability of experiencing inapplicable and/or inaccurate interference determinations (e.g., hidden node and exposed node problems).

Conventional LBT procedures may be insufficient in scenarios using beamforming techniques for data transmissions (e.g., beam-based transmissions). As previously discussed, conventional LBT procedures may suffer from hidden node and/or exposed node problems, which may become even more likely and accentuated in scenarios using beam-based transmissions. For example, if or when an omnidirectional antenna pattern is used for carrier sense while a directional antenna pattern is used for (beam-based) transmission, there may be a higher probability of a node being exposed. In another example, if or when the direction of the transmission is known, directional carrier sense may assist in certain channel conditions, but may also lead to hidden node problems.

As discussed above in reference to FIGS. 4A-4B, Rx-assisted LBT procedures may reduce the probability of hidden node and/or exposed node problems. The Rx-assisted LBT procedures may similarly reduce the probability of these problems in scenarios using beam-based transmissions. For example, in scenarios in which the data channels (e.g., PDSCH) and the control channels (e.g., PDCCH) use the same beam, these Rx-assisted LBT procedures may perform CCA detection on the beam used to receive the transmission. However, since these Rx-assisted LBT procedures do not comprise an indication of a beam for performing the CCA detection, performance of these Rx-assisted LBT procedures may be impacted in scenarios in which the data channels (e.g., PDSCH) and the control channels (e.g., PDCCH) do not use the same beams. That is, the directionality of the beams used for the data and control channels may impact the applicability and/or accuracy of the CCA detection if or when the data and control channels do not share a beam. Thus, aspects presented herein provide for multiple manners for a transmitting device to instruct a receiving device to perform LBT procedures on an specified beam of the receiving device.

Figure 5:
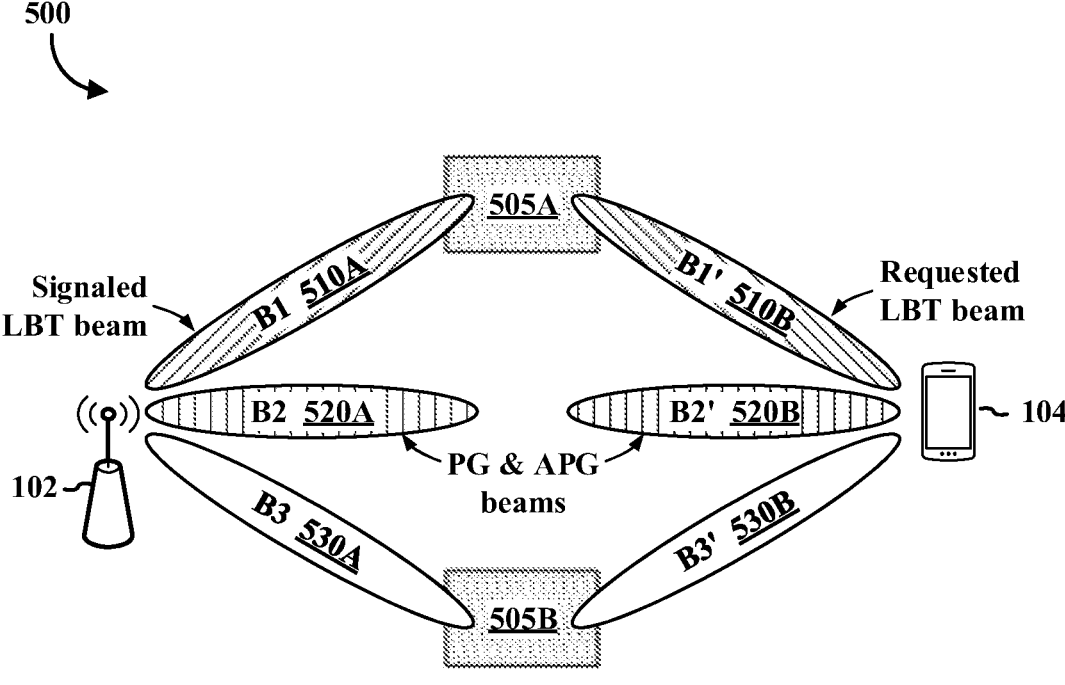
FIG. 5 is a diagram illustrating a first example of an Rx-assisted LBT procedure with explicit beam indication, in accordance with various aspects of the present disclosure.

FIG. 5 is a diagram illustrating a first example of a Rx-assisted LBT procedure with explicit beam indication 500 between a base station 102 (e.g., gNB) and a UE 104 in an access network (e.g., access network 100). The base station 102 and the UE 104 may be configured to communicate on an unlicensed band (e.g., 60 GHz band) and/or other wireless channel. The base station 102 may include a BS Rx-assisted LBT component 198. The UE 104 may include a UE Rx-assisted LBT component 199. In some aspects, the base station 102 may be configured as the transmitter and the UE 104 may be configured as the receiver. That is, in such aspects, the base station 102 and the UE 104 may be configured to perform a downlink transmission over the unlicensed band.

In the example illustrated in FIG. 5, the base station 102 and the UE 104 may communicate over a first beam pair (i.e., 510A and 510B, hereinafter "510," generally). In some aspects, the first beam pair 510 may form a propagation path via a reflector 505A. For example, the reflector 505A may be an artificial structure (e.g., a building, a bridge, etc.) or a natural feature of the terrain (e.g., a mountain, a change in elevation, etc.) that may complete a propagation path between the first beam 510A and the first beam 510B. That is, the base station 102 and the UE 104 may establish a wireless communication channel using the first beam pair 510 and the reflector 505A. In other optional or additional aspects, the wireless communication channel established using the first beam pair 510 may be configured for data channel transmissions (e.g., PDSCH).

Alternatively or additionally, the base station 102 and the UE 104 may communicate over a second beam pair (i.e., 520A and 520B, hereinafter "520," generally). In some aspects, the second beam pair 520 may establish a wireless channel directly. For example, the coverage volume of second beams 520A and 520B may overlap, such that the base station 102 and the UE 104 may establish a wireless communication channel using the second beam pair 520. In other optional or additional aspects, the wireless communication channel established using the second beam pair 520 may be configured for control channel transmissions (e.g., PDCCH). Alternatively or additionally, the base station 102 and the UE 104 may communicate over a third beam pair (i.e., 530A and 530B, hereinafter "530," generally). In some aspects, the third beam pair 530 may form a propagation path via a reflector 505B.

In some aspects, the base station 102 may initiate a LBT procedure (e.g., Cat4 LBT procedure) to obtain a COT for downlink transmissions in the unlicensed band. For example, the base station 102 may send a DL PG message to the UE 104 over a control channel (e.g., PDCCH) using the second beam pair 520.

The DL PG message may comprise a DL grant with downlink control information (DCI) indicating a particular transmission configuration indicator (TCI) state from a group of selected TCI states (e.g., 8 selected TCI states) that have been selected from an original set of candidate TCI states (e.g., 128 candidate TCI states). For example, the indication of the particular TCI state may comprise an integer value ranging between 0 and 7 that indicates the particular TCI state from the group of 8 selected TCI states that have been selected from the 128 candidate TCI states.

The particular TCI state indicated by the DL PG message may be associated with a signaled LBT beam (e.g., first beam 510A), which may have a corresponding beam of a beam pair (e.g., first beam 510B). The corresponding beam of the beam pair (e.g., first beam 510B) may be a requested LBT beam for performing a CCA and/or eCCA detection. That is, the DL PG message may instruct the UE 104 to perform CCA and/or eCCA detection on the requested LBT beam (e.g., first beam 510B) that corresponds to the signaled LBT beam (e.g., first beam 510A) that is associated with the particular TCI state indicated by the DL PG message. Alternatively or additionally, the DL PG message may instruct the UE 104 to perform additional measurements on the requested LBT beam (e.g., first beam 510B), such as an interference level, signal-to-noise ratio, and the like.

In other optional or additional aspects, the DL grant of the DL PG message may comprise one or more reserved fields, such as fields related to configuration of a modulation and coding scheme, resource allocation, and the like. That is, the DL grant may comprise reserved fields for configuration fields other than the TCI indicated by the DCI of the DL PG message.

The UE 104 may receive the DL PG message over the control channel (e.g., PDCCH) using the second beam 520B. In response to receiving the DL PG, the UE 104 may switch over to the first beam 510B and perform CCA and/or eCCA detection and/or additional measurements on the data channel (e.g., PDSCH) in response to receiving the DL PG message. The UE 104 may switch between the first beam 510B and the second beam 520B if or when a timing gap, or offset, between the control channel (e.g., PDCCH) and the data channel (e.g., PDSCH) exceeds a minimum beam switch time of the UE 104 (e.g., 4 OFDM symbols). That is, the UE 104 may switch from the second beam 520B to the first beam 510B if or when the timing gap, or offset, between the control channel (e.g., PDCCH) and the data channel (e.g., PDSCH) allows for sufficient time to effect the beam switch. If or when the timing gap does not exceed the minimum beam switch time of the UE 104, the UE 104 may use a same beam for both the control channel (e.g., PDCCH) and the data channel (e.g., PDSCH). For example, the UE 104 may apply a quasi-colocation (QCL) configuration to the control channel (e.g., PDCCH) and the data channel (e.g., PDSCH). That is, the UE 104 may determine that the properties of the data channel (e.g., PDSCH) may be inferred from the properties of the control channel (e.g., PDCCH).

The UE 104 may perform the CCA or the eCCA on the requested LBT beam (e.g., first beam 510B) in response to receiving the DL PG message. For example, the UE 104 may use ED to determine the presence (i.e., channel is busy) and/or absence (i.e., channel is idle) of other dominating signals on the unlicensed wireless channel proximate to the UE 104. The UE 104 may compare the energy detected during the CCA period or the eCCA period to the ED threshold to determine whether or not the unlicensed wireless channel is idle (e.g., open).

The UE 104 may send an APG to the base station 102 using the second beam 520B. The APG may indicate whether the CCA and/or eCCA procedure was successful (i.e., channel is idle) or not successful (i.e., channel is busy). For example, the UE 104 may send a sounding reference signal (SRS) indicating whether the CCA and/or eCCA procedure was successful or not successful. In another example, the UE 104 may send a pass indication via a physical uplink control channel (PUCCH) using the second beam 520B indicating whether the CCA and/or eCCA procedure was successful or not successful. In other optional or additional aspects, the UE 104 may refrain from sending the APG as an indication that the CCA and/or eCCA procedure was not successful (i.e., channel is busy). Alternatively or additionally, the APG may indicate results of the additional measurements performed by the UE 104 on the first beam 510B in response to receiving the DL PG message.

In response to receiving the APG from the UE 104, the base station 102 may configure and send at least a portion of the data to be transmitted to the UE 104. For example, the base station 102 may configure a modulation scheme, a coding rate, and other similar parameters for transmitting the data to the UE 104 over the unlicensed wireless channel. The base station 102 may send the data to the UE 104 over the data channel (e.g., PDSCH) using the first beam 510A. The data transmission may occur during the COT allocated according to the CCA or the eCCA performed by the UE 104. The base station 102 may configure the transmission parameters based on the interference level indicated by the APG.

In some aspects, the base station 102 may refrain from transmitting the data in response to an indication from the UE 104 that the CCA and/or eCCA was not successful (e.g., channel is busy) and/or a lack of a response that the CCA and/or eCCA was successful (e.g., channel is idle). In such aspects, the base station 102 may back off (e.g., for the duration of a back off timer) from data transmission and wait for the wireless channel to become idle, at which point the base station 102 may retry another data burst. Alternatively or additionally, the base station 102 may configure transmission of at least a portion of a data burst according to a relatively high level of interference. For example, the base station 102 may configure the transmission with a duration limitation, a different modulation scheme suitable for a high interference environment, a different coding rate suitable for a high interference environment, among others. The base station 102 may send the data with the modified configuration if or when the unlicensed wireless channel becomes idle.

The UE 104 may receive the data from the base station 102 using the first beam 510B, and in response, the UE 104 may generate and send an acknowledgement (e.g., ACK) or a negative acknowledgement (e.g., NACK) indicating whether or not the data was received and successfully decoded. That is, the UE 104 may generate and send an ACK to the base station 102 if or when the UE 104 received and successfully decoded the data sent by the base station 102. Alternatively or additionally, the UE 104 generate and send a NACK to the base station 102 if or when the UE 104 did not successfully receive and/or decode the data sent by the base station 102.

Figure 6:
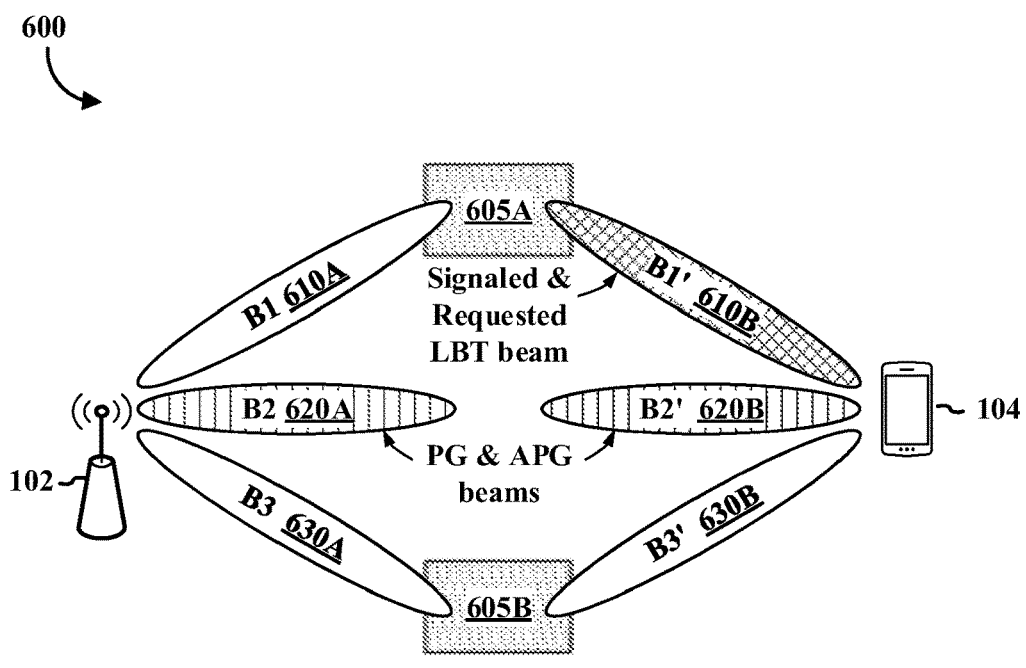
FIG. 6 is a diagram illustrating a second example of an Rx-assisted LBT procedure with explicit beam indication, in accordance with various aspects of the present disclosure.

FIG. 6 is a diagram illustrating a second example of a Rx-assisted LBT procedure with explicit beam indication 600 between a base station 102 (e.g., gNB) and a UE 104 in an access network (e.g., access network 100). The base station 102 and the UE 104 may be configured to communicate on an unlicensed band (e.g., 60 GHz band) and/or other wireless channel. The base station 102 may include a BS Rx-assisted LBT component 198. The UE 104 may include a UE Rx-assisted LBT component 199. In some aspects, the base station 102 may be configured as the transmitter and the UE 104 may be configured as the receiver. That is, in such aspects, the base station 102 and the UE 104 may be configured to perform a downlink transmission over the unlicensed band.

In the example illustrated in FIG. 6, the base station 102 and the UE 104 may communicate over a first beam pair (i.e., 610A and 610B, hereinafter "610," generally). In some aspects, the first beam pair 610 may form a propagation path via a reflector 605A. For example, the reflector 605A may be an artificial structure (e.g., a building, a bridge, etc.) or a natural feature of the terrain (e.g., a mountain, a change in elevation, etc.) that may complete a propagation path between the first beam 610A and the first beam 610B. That is, the base station 102 and the UE 104 may establish a wireless communication channel using the first beam pair 610 and the reflector 605A. In other optional or additional aspects, the wireless communication channel established using the first beam pair 610 may be configured for data channel transmissions (e.g., PDSCH).

Alternatively or additionally, the base station 102 and the UE 104 may communicate over a second beam pair (i.e., 620A and 620B, hereinafter "620," generally). In some aspects, the second beam pair 620 may establish a wireless channel directly. For example, the coverage volume of second beams 620A and 620B may overlap, such that the base station 102 and the UE 104 may establish a wireless communication channel using the second beam pair 620. In other optional or additional aspects, the wireless communication channel established using the second beam pair 620 may be configured for control channel transmissions (e.g., PDCCH). Alternatively or additionally, the base station 102 and the UE 104 may communicate over a third beam pair (i.e., 630A and 630B, hereinafter "630," generally). In some aspects, the third beam pair 630 may form a propagation path via a reflector 605B.

In some aspects, the base station 102 may initiate a LBT procedure (e.g., Cat4 LBT procedure) to obtain a COT for downlink transmissions in the unlicensed band. For example, the base station 102 may send an DL PG message to the UE 104 over a control channel (e.g., PDCCH) using the second beam pair 620.

The DL PG message may comprise an uplink grant with a SRS resource indicator (SRI) indicating a signaled LBT beam (e.g., first beam 610B), and, as such, requesting the UE 104 to perform CCA and/or eCCA detection on the requested LBT beam (e.g., first beam 610B). For example, the SRI sent by the base station 102 may indicate (i.e., signal) to the UE 104 the beam that is requested for the CCA and/or eCCA detection procedure. That is, the DL PG message may instruct the UE 104 to perform CCA and/or eCCA detection on the requested LBT beam (e.g., first beam 610B) that is indicated by the SRI in the DL PG message. In some aspects, the SRI comprised by the DL PG message may correspond to a particular beam of the UE 104 (e.g., first beam 610B) and the UE 104 may determine the signaled LBT beam according to the correspondence. Alternatively or additionally, the DL PG message may instruct the UE 104 to perform additional measurements on the requested LBT beam (e.g., first beam 610B), such as an interference level, signal-to-noise ratio, and the like.

In other optional or additional aspects, the uplink grant of the DL PG message may comprise one or more reserved fields, such as fields related to configuration of a modulation and coding scheme, resource allocation, and the like. That is, the uplink grant may comprise reserved fields for configuration fields other than the signaled LBT beam indicated by the SRI of the DL PG message.

In other optional or additional aspects, the DL PG message may comprise a PUCCH resource indicator indicating PUCCH resources (e.g., time and/or frequency) which the UE 104 may utilize to send an APG (e.g., pass indication) indicating that the CCA and/or eCCA detection was successful (e.g., channel is idle).

The UE 104 may receive the DL PG message over the control channel (e.g., PDCCH) using the second beam 620B. In response to receiving the DL PG, the UE 104 may switch over to the first beam 610B and perform CCA and/or eCCA detection and/or additional measurements on the data channel (e.g., PDSCH) in response to receiving the DL PG message. The UE 104 may switch between the first beam 610B and the second beam 620B if or when a timing gap, or offset, between the control channel (e.g., PDCCH) and the data channel (e.g., PDSCH) exceeds a minimum beam switch time of the UE 104 (e.g., 4 OFDM symbols). That is, the UE 104 may switch from the second beam 620B to the first beam 610B if or when the timing gap, or offset, between the control channel (e.g., PDCCH) and the data channel (e.g., PDSCH) allows for sufficient time to effect the beam switch. If or when the timing gap does not exceed the minimum beam switch time of the UE 104, the UE 104 may use a same beam for both the control channel (e.g., PDCCH) and the data channel (e.g., PDSCH). For example, the UE 104 may apply a QCL configuration to the control channel (e.g., PDCCH) and the data channel (e.g., PDSCH). That is, the UE 104 may determine that the properties of the data channel (e.g., PDSCH) may be inferred from the properties of the control channel (e.g., PDCCH).

The UE 104 may perform the CCA or the eCCA on the requested LBT beam (e.g., first beam 610B) in response to receiving the DL PG message. For example, the UE 104 may use ED to determine the presence (i.e., channel is busy) and/or absence (i.e., channel is idle) of other dominating signals on the unlicensed wireless channel proximate to the UE 104. The UE 104 may compare the energy detected during the CCA period or the eCCA period to the ED threshold to determine whether or not the unlicensed wireless channel is idle (e.g., idle).

The UE 104 may send an APG to the base station 102 using the second beam 620B. The APG may indicate whether the CCA and/or eCCA procedure was successful (i.e., channel is idle) or not successful (i.e., channel is busy). For example, the UE 104 may send an SRS indicating whether the CCA and/or eCCA procedure was successful or not successful. In another example, the UE 104 may send a pass indication via a PUCCH using the second beam 620B indicating whether the CCA and/or eCCA procedure was successful or not successful. In some aspects, the UE 104 may send the pass indication via the PUCCH according to the PUCCH resource indicator comprised by the DL PG message. In other optional or additional aspects, the UE 104 may refrain from sending the APG as an indication that the CCA and/or eCCA procedure was not successful (i.e., channel is busy). Alternatively or additionally, the APG may indicate results of the additional measurements performed by the UE 104 on the first beam 610B in response to receiving the DL PG message.

In response to receiving the APG from the UE 104, the base station 102 may configure and send at least a portion of the data to be transmitted to the UE 104. For example, the base station 102 may configure a modulation scheme, a coding rate, and other similar parameters for transmitting the data to the UE 104 over the unlicensed wireless channel. The base station 102 may send the data to the UE 104 over the data channel (e.g., PDSCH) using the first beam 610A. The data transmission may occur during the COT allocated according to the CCA or the eCCA performed by the UE 104. The base station 102 may configure the transmission parameters based on the interference level indicated by the APG.

In some aspects, the base station 102 may refrain from transmitting the data in response to an indication from the UE 104 that the CCA and/or eCCA was not successful (e.g., channel is busy) and/or a lack of a response that the CCA and/or eCCA was successful (e.g., channel is idle). In such aspects, the base station 102 may back off (e.g., for the duration of a back off timer) from data transmission and wait for the wireless channel to become idle, at which point the base station 102 may retry another data burst. Alternatively or additionally, the base station 102 may configure transmission of at least a portion of a data burst according to a relatively high level of interference. For example, the base station 102 may configure the transmission with a duration limitation, a different modulation scheme suitable for a high interference environment, a different coding rate suitable for a high interference environment, among others. The base station 102 may send the data with the modified configuration if or when the unlicensed wireless channel becomes idle.

The UE 104 may receive the data from the base station 102 using the first beam 610B, and in response, the UE 104 may generate and send an acknowledgement (e.g., ACK) or a negative acknowledgement (e.g., NACK) indicating whether or not the data was received and successfully decoded. That is, the UE 104 may generate and send an ACK to the base station 102 if or when the UE 104 received and successfully decoded the data sent by the base station 102. Alternatively or additionally, the UE 104 generate and send a NACK to the base station 102 if or when the UE 104 did not successfully receive and/or decode the data sent by the base station 102.

Figure 7:
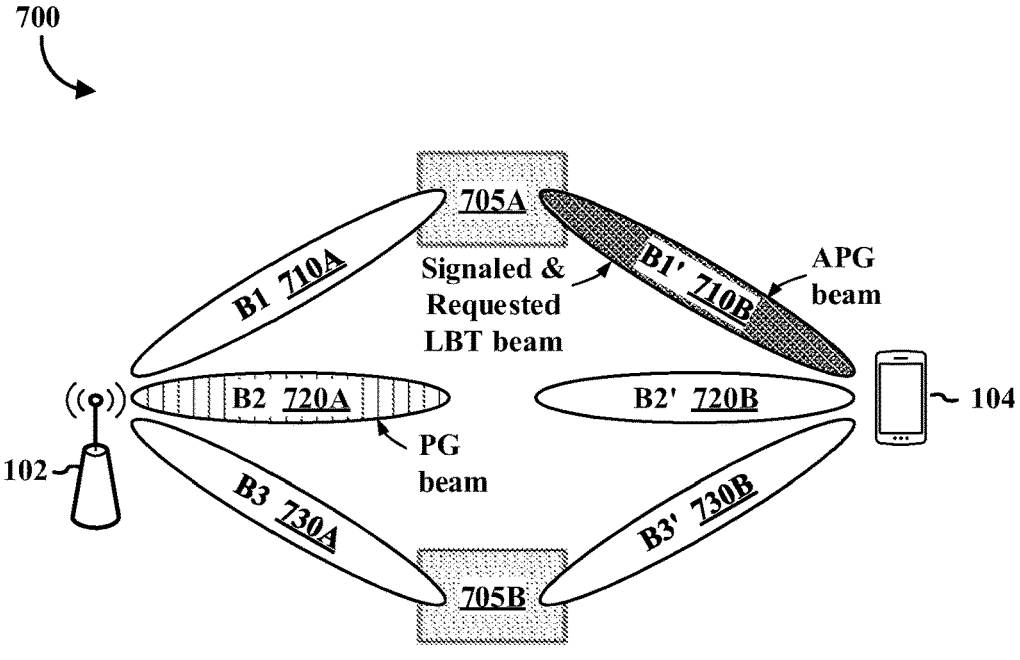
FIG. 7 is a diagram illustrating a third example of an Rx-assisted LBT procedure with explicit beam indication, in accordance with various aspects of the present disclosure.

FIG. 7 is a diagram illustrating a third example of a Rx-assisted LBT procedure with explicit beam indication 700 between a base station 102 (e.g., gNB) and a UE 104 in an access network (e.g., access network 100). The base station 102 and the UE 104 may be configured to communicate on an unlicensed band (e.g., 60 GHz band) and/or other wireless channel. The base station 102 may include a BS Rx-assisted LBT component 198. The UE 104 may include a UE Rx-assisted LBT component 199. In some aspects, the base station 102 may be configured as the transmitter and the UE 104 may be configured as the receiver. That is, in such aspects, the base station 102 and the UE 104 may be configured to perform a downlink transmission over the unlicensed band.

In the example illustrated in FIG. 7, the base station 102 and the UE 104 may communicate over a first beam pair (i.e., 710A and 710B, hereinafter "710," generally). In some aspects, the first beam pair 710 may form a propagation path via a reflector 705A. For example, the reflector 705A may be an artificial structure (e.g., a building, a bridge, etc.) or a natural feature of the terrain (e.g., a mountain, a change in elevation, etc.) that may complete a propagation path between the first beam 710A and the first beam 710B. That is, the base station 102 and the UE 104 may establish a wireless communication channel using the first beam pair 710 and the reflector 705A. In other optional or additional aspects, the wireless communication channel established using the first beam pair 710 may be configured for data channel transmissions (e.g., PDSCH).

Alternatively or additionally, the base station 102 and the UE 104 may communicate over a second beam pair (i.e., 720A and 720B, hereinafter "720," generally). In some aspects, the second beam pair 720 may establish a wireless channel directly. For example, the coverage volume of second beams 720A and 720B may overlap, such that the base station 102 and the UE 104 may establish a wireless communication channel using the second beam pair 720. In other optional or additional aspects, the wireless communication channel established using the second beam pair 720 may be configured for control channel transmissions (e.g., PDCCH). Alternatively or additionally, the base station 102 and the UE 104 may communicate over a third beam pair (i.e., 730A and 730B, hereinafter "730," generally). In some aspects, the third beam pair 730 may form a propagation path via a reflector 705B.

In some aspects, the base station 102 may initiate a LBT procedure (e.g., Cat4 LBT procedure) to obtain a COT for downlink transmissions in the unlicensed band. For example, the base station 102 may send a downlink pre-grant (DL PG) message to the UE 104 over a control channel (e.g., PDCCH) using the second beam pair 720.

The DL PG message may comprise a valid uplink grant with an SRI indicating a signaled LBT beam (e.g., first beam 710B), and, as such, requesting the UE 104 to perform CCA and/or eCCA detection on the requested LBT beam (e.g., first beam 710B). That is, the DL PG message may comprise an uplink grant with no reserved fields. For example, the SRI sent by the base station 102 may indicate (i.e., signal) to the UE 104 the beam that is requested for the CCA and/or eCCA detection procedure. That is, the DL PG message may instruct the UE 104 to perform CCA and/or eCCA detection on the requested LBT beam (e.g., first beam 710B) that is indicated by the SRI in the DL PG message. In some aspects, the SRI comprised by the DL PG message may correspond to a particular beam of the UE 104 (e.g., first beam 710B) and the UE 104 may determine the signaled LBT beam according to the correspondence. Alternatively or additionally, the DL PG message may instruct the UE 104 to perform additional measurements on the requested LBT beam (e.g., first beam 710B), such as an interference level, signal-to-noise ratio, and the like.

In other optional or additional aspects, the uplink grant of the DL PG message may comprise at least one of a modulation and coding scheme and resource allocation for a uplink data channel (e.g., PUSCH). That is, uplink grant of the DL PG may be a valid uplink grant indicating resources and/or configuration for the UE 104 to transmit uplink data.

The UE 104 may receive the DL PG message over the control channel (e.g., PDCCH) using the second beam 720B. In response to receiving the DL PG, the UE 104 may switch over to the first beam 710B and perform CCA and/or eCCA detection and/or additional measurements on the data channel (e.g., PDSCH) in response to receiving the DL PG message. The UE 104 may switch between the first beam 710B and the second beam 720B if or when a timing gap, or offset, between the control channel (e.g., PDCCH) and the data channel (e.g., PDSCH) exceeds a minimum beam switch time of the UE 104 (e.g., 4 OFDM symbols). That is, the UE 104 may switch from the second beam 720B to the first beam 710B if or when the timing gap, or offset, between the control channel (e.g., PDCCH) and the data channel (e.g., PDSCH) allows for sufficient time to effect the beam switch. If or when the timing gap does not exceed the minimum beam switch time of the UE 104, the UE 104 may use a same beam for both the control channel (e.g., PDCCH) and the data channel (e.g., PDSCH). For example, the UE 104 may apply a quasi-colocation (QCL) configuration to the control channel (e.g., PDCCH) and the data channel (e.g., PDSCH). That is, the UE 104 may determine that the properties of the data channel (e.g., PDSCH) may be inferred from the properties of the control channel (e.g., PDCCH).

The UE 104 may perform the CCA or the eCCA on the requested LBT beam (e.g., first beam 710B) in response to receiving the DL PG message. For example, the UE 104 may use ED to determine the presence (i.e., channel is busy) and/or absence (i.e., channel is idle) of other dominating signals on the unlicensed wireless channel proximate to the UE 104. The UE 104 may compare the energy detected during the CCA period or the eCCA period to the ED threshold to determine whether or not the unlicensed wireless channel is idle (e.g., open).

The UE 104 may send an APG to the base station 102 over a data channel (e.g., PUSCH) using the first beam 710B. The APG may indicate whether the CCA and/or eCCA procedure was successful (i.e., channel is idle) or not successful (i.e., channel is busy). For example, the UE 104 may send a pass indication via the PUSCH using the first beam 710B indicating whether the CCA and/or eCCA procedure was successful or not successful. In some aspects, the UE 104 may send the pass indication via the PUSCH according to the uplink resources indicated by the uplink grant in the DL PG message. Alternatively or additionally, the APG may indicate results of the additional measurements performed by the UE 104 on the first beam 710B in response to receiving the DL PG message.

In response to receiving the APG from the UE 104, the base station 102 may configure and send at least a portion of the data to be transmitted to the UE 104. For example, the base station 102 may configure a modulation scheme, a coding rate, and other similar parameters for transmitting the data to the UE 104 over the unlicensed wireless channel. The base station 102 may send the data to the UE 104 over the data channel (e.g., PDSCH) using the first beam 710A. The data transmission may occur during the COT allocated according to the CCA or the eCCA performed by the UE 104. The base station 102 may configure the transmission parameters based on the interference level indicated by the APG.

In some aspects, the base station 102 may refrain from transmitting the data in response to an indication from the UE 104 that the CCA and/or eCCA was not successful (e.g., channel is busy) and/or a lack of a response that the CCA and/or eCCA was successful (e.g., channel is idle). In such aspects, the base station 102 may back off (e.g., for the duration of a back off timer) from data transmission and wait for the wireless channel to become idle, at which point the base station 102 may retry another data burst. Alternatively or additionally, the base station 102 may configure transmission of at least a portion of a data burst according to a relatively high level of interference. For example, the base station 102 may configure the transmission with a duration limitation, a different modulation scheme suitable for a high interference environment, a different coding rate suitable for a high interference environment, among others. The base station 102 may send the data with the modified configuration if or when the unlicensed wireless channel becomes idle.

The UE 104 may receive the data from the base station 102 using the first beam 710B, and in response, the UE 104 may generate and send an acknowledgement (e.g., ACK) or a negative acknowledgement (e.g., NACK) indicating whether or not the data was received and successfully decoded. That is, the UE 104 may generate and send an ACK to the base station 102 if or when the UE 104 received and successfully decoded the data sent by the base station 102. Alternatively or additionally, the UE 104 generate and send a NACK to the base station 102 if or when the UE 104 did not successfully receive and/or decode the data sent by the base station 102.

Although FIGS. 5-7 depict three beam-formed channel pairs between the base station 102 and the UE 104, it should be understood that the base station 102 and the UE 104 may communicate using other quantities of beams, which may be configured differently, without deviating from the scope of the present disclosure. Notably, the present disclosure may be employed in any wireless communication system in which a Rx-assisted LBT procedure with explicit beam indication is performed to obtain a COT in an unlicensed wireless channel.

Figure 8:
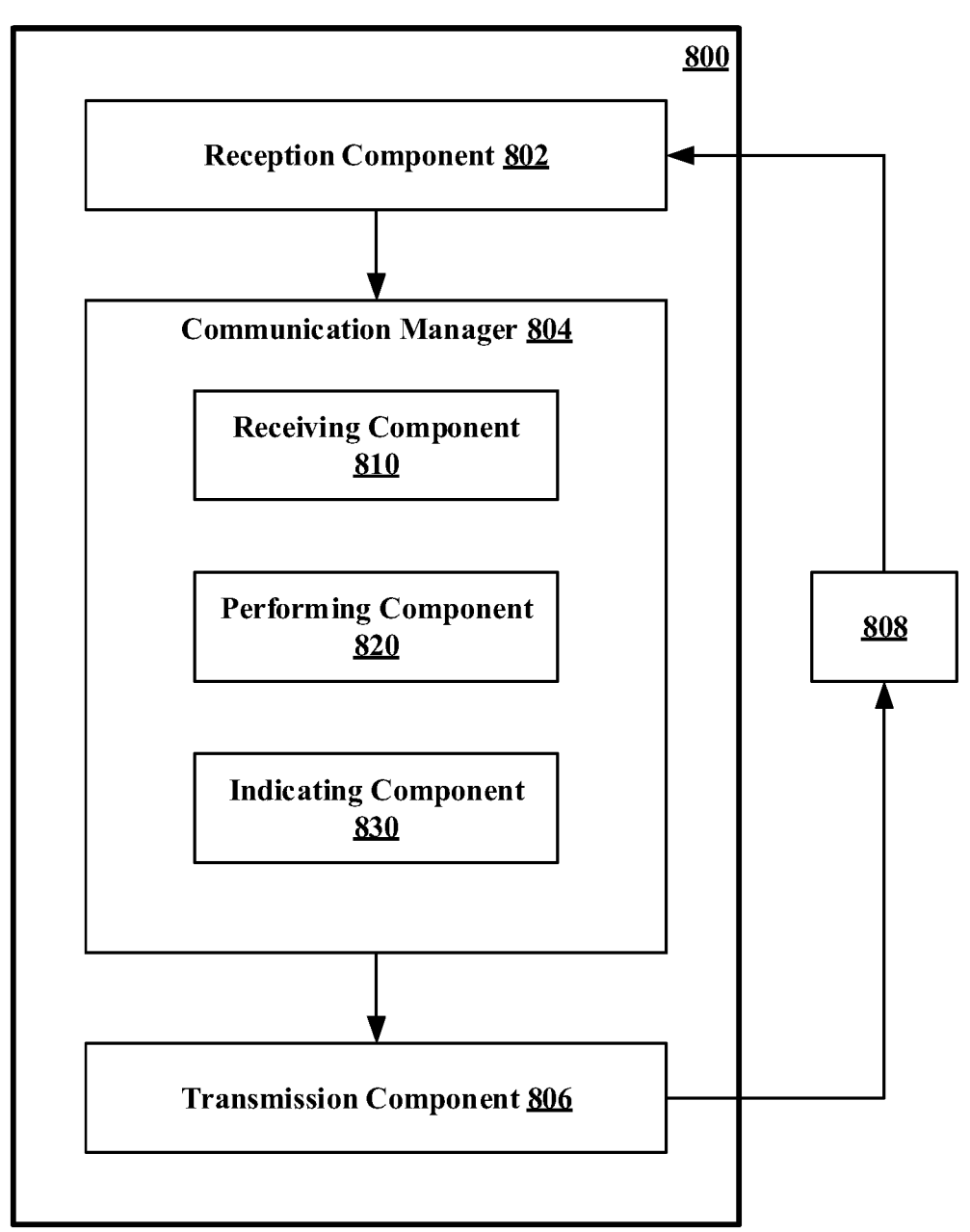
FIG. 8 is a diagram illustrating an example apparatus, such as a UE, for wireless communication, in accordance with various aspects of the present disclosure.

FIG. 8 is a block diagram of an example apparatus 800 for wireless communication. The apparatus 800 may be a UE 104 (e.g., UE 104 of FIGS. 1 and 3-7) or a UE 104 may include the apparatus 800. In some aspects, the apparatus 800 may include a reception component 802 configured to receive wireless communications from another apparatus (e.g., apparatus 808), a communication manager 804 configured to perform Rx-assisted LBT procedures with explicit beam indication, a transmission component 806 configured to transmit wireless communications to another apparatus (e.g., apparatus 808), and which may be in communication with one another (e.g., via one or more buses or electrical connections). In some aspects, the communication manager 804 may comprise the UE Rx-assisted LBT component 199. As shown, the apparatus 800 may be in communication with another apparatus 808 (such as a base station 102, or another wireless communication device) using the reception component 802 and the transmission component 806.

In some aspects, the apparatus 800 may be configured to perform one or more operations described herein in connection with FIGS. 1 and 3-7. Alternatively or additionally, the apparatus 800 may be configured to perform one or more processes described herein, such as method 900 of FIG. 9. In some aspects, the apparatus 800 may include one or more components of the UE 104 described above in connection with FIGS. 1 and 3-7.

The reception component 802 may receive communications, such as reference signals, control information, data communications, or a combination thereof, from the apparatus 808. The reception component 802 may provide received communications to one or more other components of the apparatus 800, such as the communication manager 804. In some aspects, the reception component 802 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the UE 104 described above in connection with FIGS. 1 and 3-7.

The transmission component 806 may transmit communications, such as reference signals, control information, data communications, or a combination thereof, to the apparatus 808. In some aspects, the communication manager 804 may generate communications and may transmit the generated communications to the transmission component 806 for transmission to the apparatus 808. In some aspects, the transmission component 806 may perform signal processing on the generated communications (such as filtering, amplification, modulation, digital-to-analog conversion, multiplexing, interleaving, mapping, or encoding, among other examples), and may transmit the processed signals to the apparatus 808. In other aspects, the transmission component 806 may include one or more antennas, a modulator, a transmit MIMO processor, a transmit processor, a controller/processor, a memory, or a combination thereof, of the UE 104 described above in connection with FIGS. 1 and 3-7. In some aspects, the transmission component 806 may be co-located with the reception component 802 in a transceiver or transceiver component.

The communication manager 804 may receive, from an apparatus 808 via a first beam, a pre-grant message requesting the UE to perform a LBT procedure on a second beam. The communication manager 804 may perform, according to the pre-grant message, the LBT procedure on the second beam. The communication manager 804 may indicate, to the apparatus 808, whether the LBT procedure was successful.

In some aspects, the communication manager 804 may receive an indication of a TCI state and select a corresponding beam of the TCI state as the second beam, receive a downlink grant with reserved fields, send a SRS indicating whether the LBT procedure was successful, refrain from sending the SRS as an indication that the LBT procedure was not successful, send a pass indication via a PUCCH indicating whether the LBT procedure was successful, refrain from sending the pass indication as an indication that the LBT procedure was successful, receive a SRI requesting a measurement of the second beam and perform the measurement of the second beam, and receive an uplink grant with reserved fields.

In other optional or additional aspects, the communication manager 804 may comprise the TX processor 368, the RX processor 356, the controller/processor 359, the memory 360, or a combination thereof, of the UE 104 described above in connection with FIGS. 1 and 3-7.

In some aspects, the communication manager 804 may include a set of components, such as a receiving component 810 configured to receive a pre-grant message requesting the UE to perform a LBT procedure on a second beam, a performing component 820 configured to perform the LBT procedure on the second beam, and an indicating component 830 configured to indicate whether the LBT procedure was successful.

Alternatively or additionally, the set of components may be separate and distinct from the communication manager 804. In other aspects, one or more components of the set of components may include or may be implemented within a controller/processor (e.g., the TX processor 368, the RX processor 356, the controller/processor 359), a memory (e.g., the memory 360), or a combination thereof, of the UE 104 described in FIGS. 1 and 3-7. Alternatively or additionally, one or more components of the set of components may be implemented at least in part as software stored in a memory, such as the memory 360. For example, a component (or a portion of a component) may be implemented as computer-executable instructions or code stored in a non-transitory computer-readable medium and executable by a controller or a processor to perform the functions or operations of the component.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIGS. 1 and 3-7.

Figure 9:
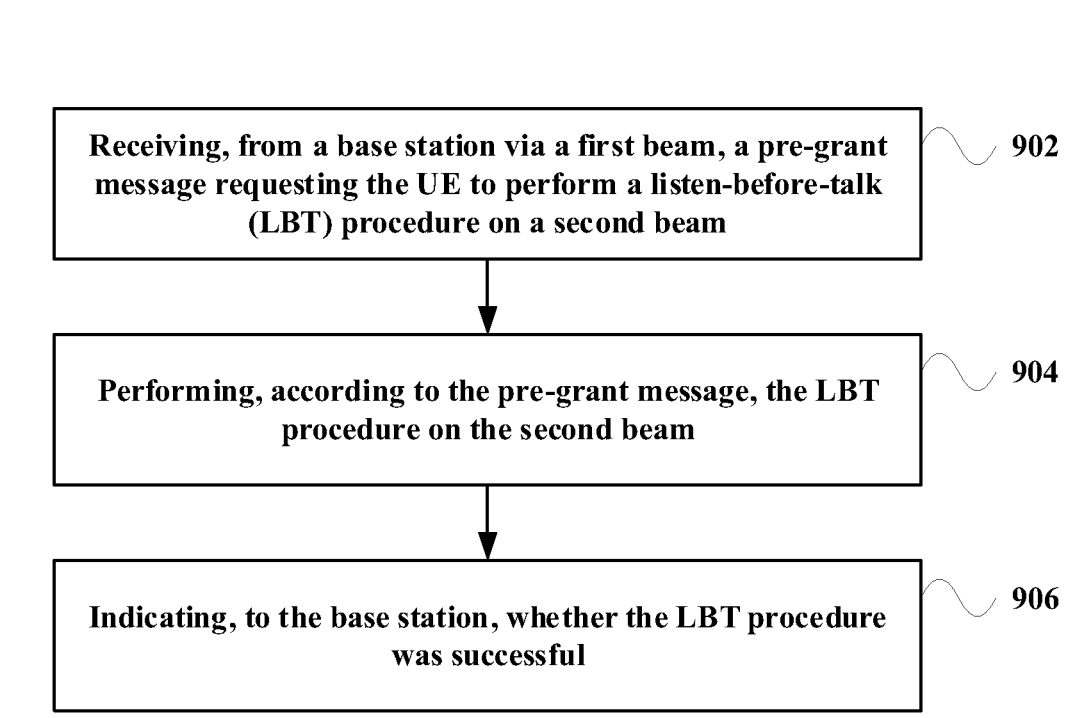
FIG. 9 is a flowchart of a method of wireless communication at a UE, in accordance with various aspects of the present disclosure.

Referring to FIG. 9, in operation, a UE 104 may perform a method 900 of wireless communication. The method 900 may be performed by the UE 104 (which may include the memory 360 and which may be the entire UE 104 and/or one or more components of the UE 104 such as the UE Rx-assisted LBT component 199, the TX processor 368, the RX processor 356, and/or the controller/processor 359). The method 900 may be performed by the UE Rx-assisted LBT component 199 in communication with the base station 102.

At block 902 of FIG. 9, the method 900 includes receiving, from a base station via a first beam, a pre-grant message requesting the UE to perform a listen-before-talk (LBT) procedure on a second beam. For example, in an aspect, the UE 104, the UE Rx-assisted LBT component 199, and/or the receiving component 810 may be configured to or may comprise means for receiving, from the base station 102 via the first beam (e.g., 520A, 620A, 720A), the pre-grant message requesting the UE to perform the LBT procedure on the second beam (e.g., 510B, 610B, 710B).

For example, the receiving at block 902 may include receiving a DL PG message from the base station 102 over a control channel (e.g., PDCCH) using a first beam pair (e.g., 520, 620, 720).

In some aspects, the DL PG message may comprise a DL grant with downlink control information (DCI) indicating a particular transmission configuration indicator (TCI) state from a group of selected TCI states (e.g., 8 selected TCI states) that have been selected from an original set of candidate TCI states (e.g., 128 candidate TCI states). For example, the indication of the particular TCI state may comprise an integer value ranging between 0 and 7 that indicates the particular TCI state from the group of 8 selected TCI states that have been selected from the 128 candidate TCI states.

In such optional or additional aspects, the particular TCI state indicated by the DL PG message may be associated with a signaled LBT beam, which may have a corresponding beam of a beam pair. The corresponding beam of the beam pair may be a requested LBT beam for performing a CCA and/or eCCA detection. That is, the DL PG message may instruct the UE 104 to perform CCA and/or eCCA detection on the requested LBT beam that corresponds to the signaled LBT beam that is associated with the particular TCI state indicated by the DL PG message.

In such optional or additional aspects, the receiving at block 902 may include selecting a corresponding beam of the TCI state (e.g., requested LBT beam) as the second beam.

In other optional or additional aspects, the DL grant of the DL PG message may comprise one or more reserved fields, such as fields related to configuration of a modulation and coding scheme, resource allocation, and the like. That is, the DL grant may comprise reserved fields for configuration fields other than the TCI indicated by the DCI of the DL PG message.

In other optional or additional aspects, the DL PG message may comprise an uplink grant with a SRS resource indicator (SRI) indicating a signaled LBT beam, and, as such, requesting the UE 104 to perform CCA and/or eCCA detection on the requested LBT beam. For example, the SRI sent by the base station 102 may indicate (i.e., signal) to the UE 104 the beam that is requested for the CCA and/or eCCA detection procedure. That is, the DL PG message may instruct the UE 104 to perform CCA and/or eCCA detection on the requested LBT beam that is indicated by the SRI in the DL PG message. In other optional or additional aspects, the SRI comprised by the DL PG message may correspond to a particular beam of the UE 104 and the UE 104 may determine the signaled LBT beam according to the correspondence.

In other optional or additional aspects, the uplink grant of the DL PG message may comprise one or more reserved fields, such as fields related to configuration of a modulation and coding scheme, resource allocation, and the like. That is, the uplink grant may comprise reserved fields for configuration fields other than the signaled LBT beam indicated by the SRI of the DL PG message.

In other optional or additional aspects, the DL PG message may comprise a PUCCH resource indicator indicating PUCCH resources (e.g., time and/or frequency) which the UE 104 may utilize to send an APG (e.g., pass indication) indicating that the CCA and/or eCCA detection was successful (e.g., channel is idle).

In other optional or additional aspects, the DL PG message may comprise a valid uplink grant with an SRI indicating a signaled LBT beam, and, as such, requesting the UE 104 to perform CCA and/or eCCA detection on the requested LBT beam. That is, the DL PG message may comprise an uplink grant with no reserved fields. For example, the SRI sent by the base station 102 may indicate (i.e., signal) to the UE 104 the beam that is requested for the CCA and/or eCCA detection procedure. That is, the DL PG message may instruct the UE 104 to perform CCA and/or eCCA detection on the requested LBT beam that is indicated by the SRI in the DL PG message. In some aspects, the SRI comprised by the DL PG message may correspond to a particular beam of the UE 104 and the UE 104 may determine the signaled LBT beam according to the correspondence.

In other optional or additional aspects, the uplink grant of the DL PG message may comprise at least one of a modulation and coding scheme and resource allocation for a uplink data channel (e.g., PUSCH). That is, the uplink grant of the DL PG may be a valid uplink grant indicating resources and/or configuration for the UE 104 to transmit uplink data.

In other optional or additional aspects, the DL PG message may instruct the UE 104 to perform additional measurements on the second beam (e.g., requested LBT beam), such as an interference level, signal-to-noise ratio, and the like.

Further, for example, the receiving at block 902 may be performed to initiate a LBT procedure (e.g., Cat4 LBT procedure) to obtain a COT for downlink transmissions in the unlicensed band. As such, aspects presented herein provide for instructing a receiving device (e.g. UE 104) to perform LBT procedures on an specified beam of the receiving device. Thus, aspects presented herein may improve reliability of the LBT procedure and facilitate transmissions in the unlicensed bands when compared to a conventional wireless communication system.

At block 904 of FIG. 9, the method 900 includes performing, according to the pre-grant message, the LBT procedure on the second beam. For example, in an aspect, the UE 104, the UE Rx-assisted LBT component 199, and/or the performing component 820 may be configured to or may comprise means for performing, according to the pre-grant message, the LBT procedure on the second beam.

For example, the performing at block 904 may include, in response to receiving the DL PG, the UE 104 may switch from the first beam (e.g., 520B, 620B, 720B) to a second beam (e.g., 510B, 610B, 710B). In some aspects, the UE 104 may switch from the first beam (e.g., 520B, 620B, 720B) to the second beam (e.g., 510B, 610B, 710B) if or when a timing gap, or offset, between the control channel (e.g., PDCCH) and the data channel (e.g., PDSCH) exceeds a minimum beam switch time of the UE 104 (e.g., 4 OFDM symbols). That is, the UE 104 may switch from the first beam (e.g., 520B, 620B, 720B) to the second beam (e.g., 510B, 610B, 710B) if or when the timing gap, or offset, between the control channel (e.g., PDCCH) and the data channel (e.g., PDSCH) allows for sufficient time to effect the beam switch.

In other optional or additional aspects, if or when the timing gap does not exceed the minimum beam switch time of the UE 104, the UE 104 may use a same beam for both the control channel (e.g., PDCCH) and the data channel (e.g., PDSCH). For example, the UE 104 may apply a quasi-colocation (QCL) configuration to the control channel (e.g., PDCCH) and the data channel (e.g., PDSCH). That is, the UE 104 may determine that the properties of the data channel (e.g., PDSCH) may be inferred from the properties of the control channel (e.g., PDCCH).

In other optional or additional aspects, the performing at block 904 includes performing CCA and/or eCCA detection on the second beam (e.g., 510B, 610B, 710B) in response to receiving the DL PG message. For example, the UE 104 may use ED to determine the presence (i.e., channel is busy) and/or absence (i.e., channel is idle) of other dominating signals on the second beam (e.g., 510B, 610B, 710B) that may be proximate to the UE 104. The UE 104 may compare the energy detected during the CCA period or the eCCA period to the ED threshold to determine whether or not the unlicensed wireless channel is idle (e.g., open).

In other optional or additional aspects, the performing at block 904 may include determining an interference level based on measuring the energy detected on the second beam (e.g., 510B, 610B, 710B). For example, the UE 104 may quantize the energy measurement based on a comparison of the energy measurement to the ED threshold. That is, if or when the energy measurement satisfies (e.g., is greater than or equal to) the ED threshold, the UE 104 may determine that the interference level of the quantized energy measurement is "busy." Alternatively or additionally, if or when the energy measurement fails to satisfy (e.g., is less than) the ED threshold, the UE 104 may determine that the interference level of the quantized energy measurement is "idle."

In other optional or additional aspects, the performing at block 904 may include determining the interference level based on a comparison of the energy measurement to a plurality of thresholds. The plurality of thresholds may include the ED threshold and at least one other threshold lower than the ED threshold. For example, if or when the energy measurement satisfies the other threshold but fails to satisfy the ED threshold, the UE 104 may determine that the interference level of the quantized energy measurement is "medium" (but still idle/open). Alternatively or additionally, if or when the energy measurement fails to satisfy the other threshold (and therefore also fails to satisfy the ED threshold), the UE 104 may determine that the interference level of the quantized energy measurement is "idle." Alternatively or additionally, if or when the energy measurement satisfies the ED threshold, the UE 104 may determine that the interference level of the quantized energy measurement is "busy."

Further, for example, the performing at block 904 may detect interference and/or perform additional measurements on the specified beam (e.g., second beam) proximate to the receiving device (e.g., UE 104). As such, aspects presented herein provide for performing the LBT procedures on the specified beam to detect interference proximate to the receiving device. Thus, aspects presented herein may improve reliability of the LBT procedure and facilitate transmissions in the unlicensed bands when compared to a conventional wireless communication system.

At block 906 of FIG. 9, the method 900 includes indicating, to the base station, whether the LBT procedure was successful. For example, in an aspect, the UE 104, the UE Rx-assisted LBT component 199, and/or the indicating component 830 may be configured to or may comprise means for indicating, to the base station 102, whether the LBT procedure was successful.

For example, the indicating at block 906 may include sending an acknowledgement (e.g., ACK) to the DL PG message (APG) to the base station 102. The UE 104 send the APG using a third beam. The APG may indicate that the CCA and/or eCCA procedure was successful (i.e., channel is idle).

In some aspects, the indicating at block 906 may include sending a sounding reference signal (SRS) indicating whether the CCA and/or eCCA procedure was successful or not successful. In other optional or additional aspects, the indicating at block 906 may include sending a pass indication via a PUCCH, using the third beam, indicating whether the CCA and/or eCCA procedure was successful or not successful.

In other optional or additional aspects, the indicating at block 906 may include sending the pass indication via the PUSCH according to the uplink resources indicated by the uplink grant in the DL PG message.

In other optional or additional aspects, the indicating at block 906 may include refraining from sending the APG as an indication that the CCA and/or eCCA procedure was not successful (i.e., channel is busy). For example, the UE 104 may refrain from sending an SRS and/or a pass indication as an indication that the CCA and/or eCCA procedure was not successful.

In other optional or additional aspects, the APG may indicate results of the additional measurements performed by the UE 104 on the second beam, in response to receiving the DL PG message.

Further, for example, the indicating at block 906 may be performed to notify the transmitting device (e.g., base station 102) of the results of the CCA and/or eCCA detection performed by the receiving device (e.g., UE 104) on the specified beam in an environment proximate to the receiving device. Thus, aspects presented herein may improve reliability of the LBT procedure and facilitate transmissions in the unlicensed bands when compared to a conventional wireless communication system.

Figure 10:
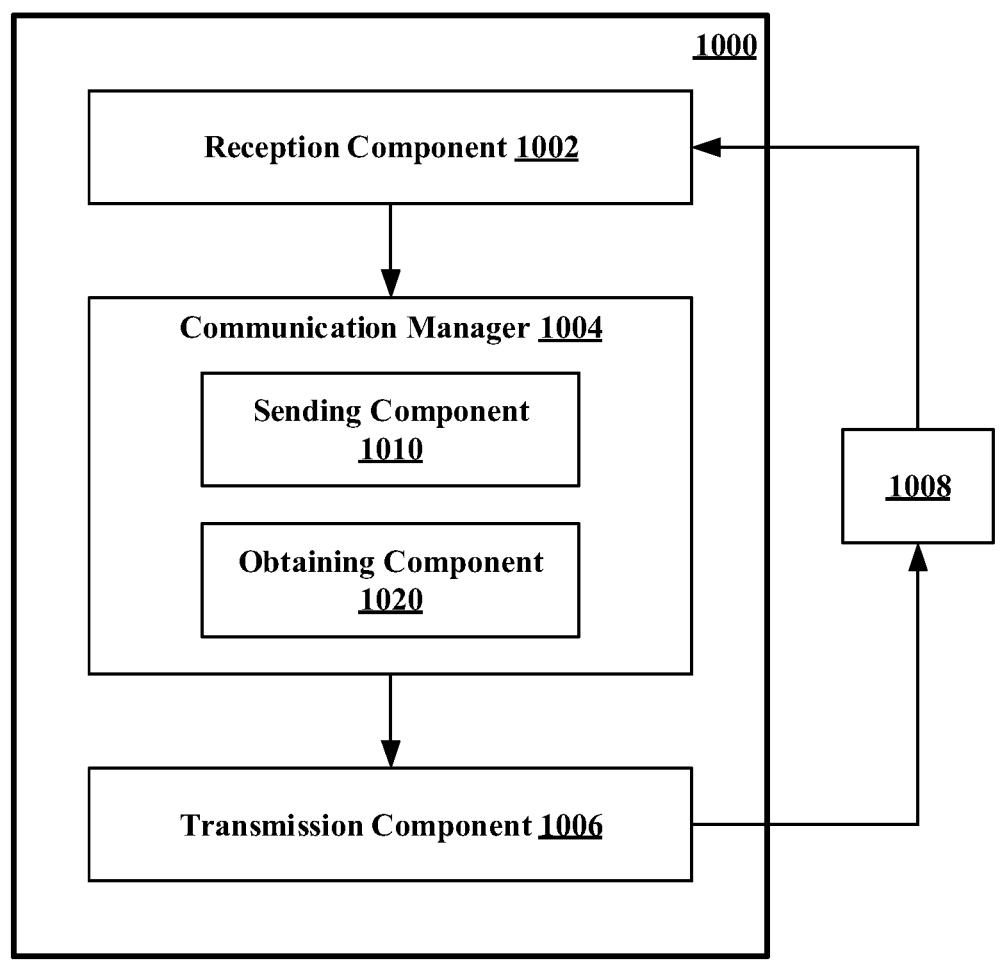
FIG. 10 is a diagram illustrating an example apparatus, such as a base station, for wireless communication, in accordance with various aspects of the present disclosure.

FIG. 10 is a block diagram of an example apparatus 1000 for wireless communication. The apparatus 1000 may be a base station 102 (e.g., base station 102 of FIGS. 1 and 3-7) or a base station 102 may include the apparatus 1000. In some aspects, the apparatus 1000 may include a reception component 1002 configured to receive wireless communications from another apparatus (e.g., apparatus 1008), a communication manager 1004 configured to perform Rx-assisted LBT procedures with explicit beam indication, a transmission component 1006 configured to transmit wireless communications to another apparatus (e.g., apparatus 1008), and which may be in communication with one another (e.g., via one or more buses or electrical connections). In some aspects, the communication manager 1004 may comprise the BS Rx-assisted LBT component 198. As shown, the apparatus 1000 may be in communication with another apparatus 1008 (such as a UE 104, or another wireless communication device) using the reception component 1002 and the transmission component 1006.

In some aspects, the apparatus 1000 may be configured to perform one or more operations described herein in connection with FIGS. 1 and 3-5. Alternatively or additionally, the apparatus 1000 may be configured to perform one or more processes described herein, such as method 1100 of FIG. 11. In some aspects, the apparatus 1000 may include one or more components of the base station 102 described above in connection with FIGS. 1 and 3-5.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, de-interleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the base station 102 described above in connection with FIGS. 1 and 3-7.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In other aspects, the transmission component 1006 may include one or more antennas, a modulator, a transmit MIMO processor, a transmit processor, a controller/processor, a memory, or a combination thereof, of the base station 102 described above in connection with FIGS. 1 and 3-7. In some aspects, the transmission component 1006 may be co-located with the reception component 1002 in a transceiver or transceiver component.

The communication manager 1004 may send a pre-grant message requesting the UE to perform a LBT procedure on a second beam. The communication manager 1004 may obtain an indication of whether the LBT procedure was successful. The communication manager 1004 may send downlink data via the second beam.

In some aspects, the communication manager 1004 may send an indication of a TCI state, send a downlink grant with reserved fields, receive a SRS indicating whether the LBT procedure was successful, determine that the UE refrained from sending a SRS as an indication that the LBT procedure was not successful, receive a pass indication indicating whether the LBT procedure was successful, determine that the UE refrained from sending the pass indication as an indication that the LBT procedure was not successful, send an SRI requesting a measurement of the second beam, send an uplink grant with reserved fields, and send an uplink grant comprising the SRI.

In other optional or additional aspects, the communication manager 1004 may comprise the TX processor 316, the RX processor 370, the controller/processor 375, the memory 376, or a combination thereof, of the base station 102 described above in connection with FIGS. 1 and 3-7.

In some aspects, the communication manager 1004 may include a set of components, such as a sending component 1010 configured to a pre-grant message requesting the UE to perform a LBT procedure on a second beam and to send downlink data via the second beam, and a obtaining component 1020 configured to obtain an indication of whether the LBT procedure was successful.

Alternatively or additionally, the set of components may be separate and distinct from the communication manager 1004. In other aspects, one or more components of the set of components may include or may be implemented within a controller/processor (e.g., the TX processor 316, the RX processor 370, the controller/processor 375), a memory (e.g., the memory 376), or a combination thereof, of the base station 102 described in FIGS. 1 and 3-7. Alternatively or additionally, one or more components of the set of components may be implemented at least in part as software stored in a memory, such as the memory 376. For example, a component (or a portion of a component) may be implemented as computer-executable instructions or code stored in a non-transitory computer-readable medium and executable by a controller or a processor to perform the functions or operations of the component.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIGS. 1 and 3-7.

Figure 11:
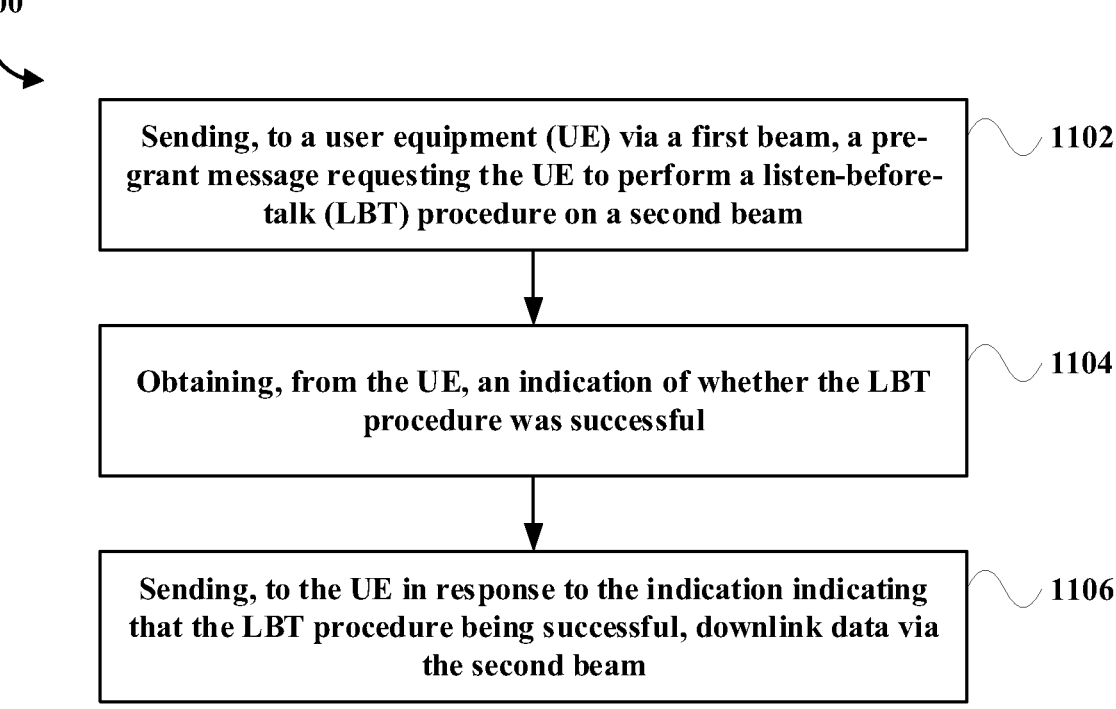
FIG. 11 is a flowchart of a method of wireless communication at a base station, in accordance with various aspects of the present disclosure.

Referring to FIG. 11, in operation, a base station 102 may perform a method 1100 of wireless communication. The method 1100 may be performed by the base station 102 (which may include the memory 376 and which may be the entire base station 102 and/or one or more components of the base station 102 such as the BS Rx-assisted LBT component 198, the TX processor 316, the RX processor 370, and/or the controller/processor 375). The method 1100 may be performed by the BS Rx-assisted LBT component 198 in communication with the UE 104.

At block 1102 of FIG. 11, the method 1100 includes sending, to a user equipment (UE) via a first beam, a pre-grant message requesting the UE to perform a listen-before-talk (LBT) procedure on a second beam. For example, in an aspect, the base station 102, the BS Rx-assisted LBT component 198, and/or the sending component 1010 may be configured to or may comprise means for sending, to the UE 104 via the first beam (e.g., 520A, 620A, 720A), a pre-grant message requesting the UE to perform the LBT procedure on the second beam (e.g., 510B, 610B, 710B).

For example, the sending at block 1102 may include sending a DL PG message to the UE 104 over a control channel (e.g., PDCCH) using a first beam pair (e.g., 520, 620, 720).

In some aspects, the DL PG message may comprise a DL grant with downlink control information (DCI) indicating a particular transmission configuration indicator (TCI) state from a group of selected TCI states (e.g., 8 selected TCI states) that have been selected from an original set of candidate TCI states (e.g., 128 candidate TCI states). For example, the indication of the particular TCI state may comprise an integer value ranging between 0 and 7 that indicates the particular TCI state from the group of 8 selected TCI states that have been selected from the 128 candidate TCI states.

In such optional or additional aspects, the particular TCI state indicated by the DL PG message may be associated with a signaled LBT beam, which may have a corresponding beam of a beam pair. The corresponding beam of the beam pair may be a requested LBT beam for performing a CCA and/or eCCA detection. That is, the DL PG message may instruct the UE 104 to perform CCA and/or eCCA detection on the requested LBT beam that corresponds to the signaled LBT beam that is associated with the particular TCI state indicated by the DL PG message.

In such optional or additional aspects, sending the DL PG comprising the indication of the particular TCI state may cause the UE 104 to select a corresponding beam of the TCI state (e.g., requested LBT beam) as the second beam (e.g., 510B, 610B, 710B).

In other optional or additional aspects, the DL grant of the DL PG message may comprise one or more reserved fields, such as fields related to configuration of a modulation and coding scheme, resource allocation, and the like. That is, the DL grant may comprise reserved fields for configuration fields other than the TCI indicated by the DCI of the DL PG message.

In other optional or additional aspects, the DL PG message may comprise an uplink grant with a SRS resource indicator (SRI) indicating a signaled LBT beam, and, as such, requesting the UE 104 to perform CCA and/or eCCA detection on the requested LBT beam. For example, the SRI sent by the base station 102 may indicate (i.e., signal) to the UE 104 the beam that is requested for the CCA and/or eCCA detection procedure. That is, the DL PG message may instruct the UE 104 to perform CCA and/or eCCA detection on the requested LBT beam that is indicated by the SRI in the DL PG message.

In other optional or additional aspects, the uplink grant of the DL PG message may comprise one or more reserved fields, such as fields related to configuration of a modulation and coding scheme, resource allocation, and the like. That is, the uplink grant may comprise reserved fields for configuration fields other than the signaled LBT beam indicated by the SRI of the DL PG message.

In other optional or additional aspects, the DL PG message may comprise a PUCCH resource indicator indicating PUCCH resources (e.g., time and/or frequency) which the UE 104 may utilize to send an APG (e.g., pass indication) indicating that the CCA and/or eCCA detection was successful (e.g., channel is idle).

In other optional or additional aspects, the DL PG message may comprise a valid uplink grant with an SRI indicating a signaled LBT beam, and, as such, requesting the UE 104 to perform CCA and/or eCCA detection on the requested LBT beam. That is, the DL PG message may comprise an uplink grant with no reserved fields. For example, the SRI sent by the base station 102 may indicate (i.e., signal) to the UE 104 the beam that is requested for the CCA and/or eCCA detection procedure. That is, the DL PG message may instruct the UE 104 to perform CCA and/or eCCA detection on the requested LBT beam that is indicated by the SRI in the DL PG message.

In other optional or additional aspects, the uplink grant of the DL PG message may comprise at least one of a modulation and coding scheme and resource allocation for a uplink data channel (e.g., PUSCH). That is, the uplink grant of the DL PG may be a valid uplink grant indicating resources and/or configuration for the UE 104 to transmit uplink data.

In other optional or additional aspects, the DL PG message may instruct the UE 104 to perform additional measurements on the second beam (e.g., requested LBT beam), such as an interference level, signal-to-noise ratio, and the like.

Further, for example, the sending at block 1102 may be performed to initiate a LBT procedure (e.g., Cat4 LBT procedure) to obtain a COT for downlink transmissions in the unlicensed band. As such, aspects presented herein provide for instructing a receiving device (e.g. UE 104) to perform LBT procedures on an specified beam of the receiving device. Thus, aspects presented herein may improve reliability of the LBT procedure and facilitate transmissions in the unlicensed bands when compared to a conventional wireless communication system.

At block 1104 of FIG. 11, the method 1100 includes obtaining, from the UE, an indication of whether the LBT procedure was successful. For example, in an aspect, the base station 102, the BS Rx-assisted LBT component 198, and/or the obtaining component 1020 may be configured to or may comprise means for obtaining, from the UE, an indication of whether the LBT procedure was successful.

For example, the obtaining at block 1104 may include receiving an acknowledgement (e.g., ACK) to the DL PG message (APG) from the UE 104. The base station may receive the APG using a third beam. The APG may indicate that the CCA and/or eCCA procedure was successful (i.e., channel is idle).

In some aspects, the obtaining at block 1104 may include receiving a sounding reference signal (SRS) indicating that the CCA and/or eCCA procedure was successful. In other optional or additional aspects, the obtaining at block 1104 may include receiving a pass indication via a PUCCH, using the third beam, indicating that the CCA and/or eCCA procedure was successful.

In other optional or additional aspects, the obtaining at block 1104 may include receiving the pass indication via the PUSCH according to the uplink resources indicated by the uplink grant in the DL PG message.

In other optional or additional aspects, the obtaining at block 1104 may include determining that the UE 104 refrained from sending the APG as an indication that the CCA and/or eCCA procedure was not successful (i.e., channel is busy). For example, the UE 104 may refrain from sending an SRS and/or a pass indication as an indication that the CCA and/or eCCA procedure was not successful (e.g., NACK).

In other optional or additional aspects, the APG may indicate results of the additional measurements performed by the UE 104 on the second beam, in response to receiving the DL PG message.

Further, for example, the obtaining at block 1104 may be performed to notify the transmitting device (e.g., base station 102) of the results of the CCA and/or eCCA detection performed by the receiving device (e.g., UE 104) on the specified beam in an environment proximate to the receiving device. Thus, aspects presented herein may improve reliability of the LBT procedure and facilitate transmissions in the unlicensed bands when compared to a conventional wireless communication system.

At block 1106 of FIG. 11, the method 1100 includes sending, to the UE in response to the indication indicating that the LBT procedure being successful, downlink data via the second beam. For example, in an aspect, the base station 102, the BS Rx-assisted LBT component 198, and/or the sending component 1010 may be configured to or may comprise means for sending, to the UE 104 in response to the indication indicating that the LBT procedure being successful, downlink data via the second beam.

For example, the sending at block 1102 may include, in response to receiving the APG from the UE 104 indicating that the CCA and/or eCCA detection was successful, configuring and sending at least a portion of the data to be transmitted to the UE 104. That is, the sending at block 1102 may include configuring a modulation scheme, a coding rate, and other similar parameters for transmitting the data to the UE 104 over the unlicensed wireless channel using the second beam.

In some aspects, the sending at block 1102 may include sending the data to the UE 104 over the data channel (e.g., PDSCH) using the second beam. In other optional or additional aspects, the data transmission may occur during the COT allocated according to the CCA or the eCCA performed by the UE 104. In other optional or additional aspects, the base station 102 may configure the transmission parameters based on the interference level indicated by the APG.

Further, for example, the sending at block 1106 may be performed transmit data to the receiving device (e.g., UE 104) during the COT obtained by the Rx-assisted LBT procedure. Thus, aspects presented herein may improve reliability of the LBT procedure and facilitate transmissions in the unlicensed bands when compared to a conventional wireless communication system.

Implementation examples are described in the following numbered clauses

1. A method of wireless communication at a user equipment (UE) of a mobile network, comprising:
   receiving, from a base station via a first beam, a pre-grant message requesting the UE to perform a listen-before-talk (LBT) procedure on a second beam;
   performing, according to the pre-grant message, the LBT procedure on the second beam; and
   indicating, to the base station, whether the LBT procedure was successful.

2. The method of clause 1, wherein receiving the pre-grant message comprises:
   receiving, from the base station, an indication of a transmission configuration indicator (TCI) state; and
   selecting a corresponding beam of the TCI state as the second beam.

3. The method of clause 2,
   wherein receiving the pre-grant message further comprises receiving a downlink grant with reserved fields, the downlink grant indicating the TCI state; and
   wherein indicating whether the LBT procedure was successful comprises sending, to the base station via a third beam, a sounding reference signal (SRS) as an indication that the LBT procedure was successful.

4. The method of clause 2 or 3,
   wherein receiving the pre-grant message further comprises receiving a downlink grant with reserved fields, the downlink grant indicating the TCI state; and
   wherein indicating whether the LBT procedure was successful comprises refraining from sending, to the base station, a sounding reference signal (SRS) as an indication that the LBT procedure was not successful.

5. The method of any of the clauses 2-4,
   wherein receiving the pre-grant message further comprises receiving a downlink grant with reserved fields, the downlink grant indicating the TCI state; and
   wherein indicating whether the LBT procedure was successful comprises sending, to the base station via a physical uplink control channel (PUCCH) on a third beam, a pass indication indicating that the LBT procedure was successful.

6. The method of any of the clauses 2-5,
   wherein receiving the pre-grant message further comprises receiving a downlink grant with reserved fields, the downlink grant indicating the TCI state; and
   wherein indicating whether the LBT procedure was successful comprises refraining from sending, to the base station, a pass indication as an indication that the LBT procedure was not successful.

7. The method of any of the clauses 1-6, wherein receiving the pre-grant message comprises:
   receiving, via the first beam, a sounding reference signal (SRS) resource indicator (SRI) requesting a measurement of the second beam; and
   performing the measurement of the second beam.

8. The method of clause 7,
   wherein receiving the pre-grant message further comprises receiving an uplink grant with reserved fields, the uplink grant comprising the SRI; and
   wherein indicating whether the LBT procedure was successful comprises sending, to the base station via a third beam, a sounding reference signal (SRS) as an indication that the LBT procedure was successful.

9. The method of clause 7 or 8,
   wherein receiving the pre-grant message further comprises receiving an uplink grant with reserved fields, the uplink grant comprising the SRI; and
   wherein indicating whether the LBT procedure was successful comprises refraining from sending, to the base station, a sounding reference signal (SRS) as an indication that the LBT procedure was not successful.

10. The method of any of the clauses 7-9,
    wherein receiving the pre-grant message further comprises receiving an uplink grant with reserved fields, the uplink grant comprising the SRI and a physical uplink control channel (PUCCH) resource indicator field; and
    wherein indicating whether the LBT procedure was successful comprises sending, to the base station via the PUCCH on a third beam, a pass indication indicating that the LBT procedure was successful.

11. The method of any of the clauses 7-10,
    wherein receiving the pre-grant message further comprises receiving an uplink grant with reserved fields, the uplink grant comprising the SRI; and
    wherein indicating whether the LBT procedure was successful comprises refraining from sending, to the base station, a pass indication as an indication that the LBT procedure was not successful.

12. The method of any of the clauses 7-11,
    wherein receiving the pre-grant message further comprises receiving an uplink grant comprising the SRI; and
    wherein indicating whether the LBT procedure was successful comprises sending, to the base station via a physical uplink shared channel (PUSCH) on the second beam, a pass indication indicating whether the LBT procedure was successful.

13. The method of clause 12,
    wherein receiving the pre-grant message further comprises receiving a transmission configuration of the PUSCH, the transmission configuration indicating at least one of a modulation and coding scheme (MCS) and a transmission resource; and
    wherein sending, to the base station via the PUSCH on the second beam, the pass indication comprises sending the pass indication according to the transmission configuration.

14. The method of clause 12 or 13, wherein the pass indication comprises first results of the LBT procedure.

15. The method of clause 14, wherein the pass indication further comprises second results of the measurement of the second beam requested by the base station.

16. An apparatus of wireless communication at a user equipment (UE) of a mobile network, comprising:
    a non-transitory memory storing computer-executable instructions; and
    a processor communicatively coupled with the non-transitory memory and configured to execute the computer-executable instructions to:
        receive, from a base station via a first beam, a pre-grant message requesting the UE to perform a listen-before-talk (LBT) procedure on a second beam;
        perform, according to the pre-grant message, the LBT procedure on the second beam; and
        indicate, to the base station, whether the LBT procedure was successful.

17. The apparatus of clause 16, wherein to receive the pre-grant message comprises further computer-executable instructions to:
    receive, from the base station, an indication of a transmission configuration indicator (TCI) state; and
    select a corresponding beam of the TCI state as the second beam.

18. The apparatus of clause 17,
    wherein to receive the pre-grant message comprises further computer-executable instructions to receive a downlink grant with reserved fields, the downlink grant indicating the TCI state; and
    wherein to indicate whether the LBT procedure was successful comprises further computer-executable instructions to send, to the base station via a third beam, a sounding reference signal (SRS) as an indication that the LBT procedure was successful.

19. The apparatus of clause 17 or 18,
    wherein to receive the pre-grant message further comprises further computer-executable instructions to receive a downlink grant with reserved fields, the downlink grant indicating the TCI state; and
    wherein to indicate whether the LBT procedure was successful comprises further computer-executable instructions to refrain from sending, to the base station, a sounding reference signal (SRS) as an indication that the LBT procedure was not successful.

20. The apparatus of any of the clauses 17-19,
    wherein to receive the pre-grant message further comprises further computer-executable instructions to receive receiving a downlink grant with reserved fields, the downlink grant indicating the TCI state; and
    wherein to indicate whether the LBT procedure was successful comprises further computer-executable instructions to send, to the base station via a physical uplink control channel (PUCCH) on a third beam, a pass indication indicating that the LBT procedure was successful.

21. The apparatus of any of the clauses 17-20,
    wherein to receive the pre-grant message further comprises further computer-executable instructions to receive a downlink grant with reserved fields, the downlink grant indicating the TCI state; and
    wherein to indicate whether the LBT procedure was successful comprises further computer-executable instructions to refrain from sending, to the base station, a pass indication as an indication that the LBT procedure was not successful.

22. The apparatus of any of the clauses 16-21, wherein to receive the pre-grant message comprises further computer-executable instructions to:
    receive, via the first beam, a sounding reference signal (SRS) resource indicator (SRI) requesting a measurement of the second beam; and
    perform the measurement of the second beam.

23. The apparatus of clause 22,
    wherein to receive the pre-grant message further comprises further computer-executable instructions to receive an uplink grant with reserved fields, the uplink grant comprising the SRI; and
    wherein to indicate whether the LBT procedure was successful comprises further computer-executable instructions to send, to the base station via a third beam, a sounding reference signal (SRS) as an indication that the LBT procedure was successful.

24. The apparatus of clause 22 or 23,
    wherein to receive the pre-grant message further comprises further computer-executable instructions to receive an uplink grant with reserved fields, the uplink grant comprising the SRI; and
    wherein to indicate whether the LBT procedure was successful comprises further computer-executable instructions to refrain from sending, to the base station, a sounding reference signal (SRS) as an indication that the LBT procedure was not successful.

25. The apparatus of any of the clauses 22-24,
    wherein to receive the pre-grant message further comprises further computer-executable instructions to receive an uplink grant with reserved fields, the uplink grant comprising the SRI and a physical uplink control channel (PUCCH) resource indicator field; and
    wherein to indicate whether the LBT procedure was successful comprises further computer-executable instructions to send, to the base station via the PUCCH on a third beam, a pass indication indicating that the LBT procedure was successful.

26. The apparatus of any of the clauses 22-25, wherein to receive the pre-grant message further comprises further computer-executable instructions to receive an uplink grant with reserved fields, the uplink grant comprising the SRI; and wherein to indicate whether the LBT procedure was successful comprises further computer-executable instructions to refrain from sending, to the base station, a pass indication as an indication that the LBT procedure was not successful.

27. The apparatus of any of the clauses 22-26, wherein to receive the pre-grant message further comprises further computer-executable instructions to receive an uplink grant comprising the SRI; and wherein to indicate whether the LBT procedure was successful comprises further computer-executable instructions to send, to the base station via a physical uplink shared channel (PUSCH) on the second beam, a pass indication indicating whether the LBT procedure was successful.

28. The apparatus of clause 27, wherein to receive the pre-grant message further comprises further computer-executable instructions to receive a transmission configuration of the PUSCH, the transmission configuration indicating at least one of a modulation and coding scheme (MCS) and a transmission resource; and wherein to send, to the base station via the PUSCH on the second beam, the pass indication comprises further computer-executable instructions to send the pass indication according to the transmission configuration.

29. The apparatus of clause 27 or 28, wherein the pass indication comprises first results of the LBT procedure.

30. The apparatus of clause 29, wherein the pass indication further comprises second results of the measurement of the second beam requested by the base station.

31. An apparatus of wireless communication at a user equipment (UE) of a mobile network, comprising:

means for receiving, from a base station via a first beam, a pre-grant message requesting the UE to perform a listen-before-talk (LBT) procedure on a second beam;

means for performing, according to the pre-grant message, the LBT procedure on the second beam; and means for indicating, to the base station, whether the LBT procedure was successful.

32. The apparatus of clause 31, wherein the means for receiving the pre-grant message comprises:

means for receiving, from the base station, an indication of a transmission configuration indicator (TCI) state; and means for selecting a corresponding beam of the TCI state as the second beam.

33. The apparatus of clause 32, wherein the means for receiving the pre-grant message further comprises means for receiving a downlink grant with reserved fields, the downlink grant indicating the TCI state; and wherein the means for indicating whether the LBT procedure was successful comprises means for sending, to the base station via a third beam, a sounding reference signal (SRS) as an indication that the LBT procedure was successful.

34. The apparatus of clause 32 or 33, wherein the means for receiving the pre-grant message further comprises means for receiving a downlink grant with reserved fields, the downlink grant indicating the TCI state; and wherein the means for indicating whether the LBT procedure was successful comprises means for refraining from sending, to the base station, a sounding reference signal (SRS) as an indication that the LBT procedure was not successful.

35. The apparatus of any of the clauses 32-34, wherein the means for receiving the pre-grant message further comprises means for receiving a downlink grant with reserved fields, the downlink grant indicating the TCI state; and wherein the means for indicating whether the LBT procedure was successful comprises means for sending, to the base station via a physical uplink control channel (PUCCH) on a third beam, a pass indication indicating that the LBT procedure was successful.

36. The apparatus of any of the clauses 32-35, wherein the means for receiving the pre-grant message further comprises means for receiving a downlink grant with reserved fields, the downlink grant indicating the TCI state; and wherein the means for indicating whether the LBT procedure was successful comprises means for refraining from sending, to the base station, a pass indication as an indication that the LBT procedure was not successful.

37. The apparatus of any of the clauses 31-36, wherein the means for receiving the pre-grant message comprises:

means for receiving, via the first beam, a sounding reference signal (SRS) resource indicator (SRI) requesting a measurement of the second beam; and means for performing the measurement of the second beam.

38. The apparatus of clause 37, wherein the means for receiving the pre-grant message further comprises means for receiving an uplink grant with reserved fields, the uplink grant comprising the SRI; and wherein the means for indicating whether the LBT procedure was successful comprises means for sending, to the base station via a third beam, a sounding reference signal (SRS) as an indication that the LBT procedure was successful.

39. The apparatus of clause 37 or 38, wherein the means for receiving the pre-grant message further comprises means for receiving an uplink grant with reserved fields, the uplink grant comprising the SRI; and wherein the means for indicating whether the LBT procedure was successful comprises means for refraining from sending, to the base station, a sounding reference signal (SRS) as an indication that the LBT procedure was not successful.

40. The apparatus of any of the clauses 37-39, wherein the means for receiving the pre-grant message further comprises means for receiving an uplink grant with reserved fields, the uplink grant comprising the SRI and a physical uplink control channel (PUCCH) resource indicator field; and wherein the means for indicating whether the LBT procedure was successful comprises means for sending, to the base station via the PUCCH on a third beam, a pass indication indicating that the LBT procedure was successful.

41. The apparatus of any of the clauses 37-40,
   wherein the means for receiving the pre-grant message
      further comprises means for receiving an uplink
      grant with reserved fields, the uplink grant compris-
      ing the SRI; and
   wherein the means for indicating whether the LBT
      procedure was successful comprises means for
      refraining from sending, to the base station, a pass
      indication as an indication that the LBT procedure
      was not successful.

42. The apparatus of any of the clauses 37-41,
   wherein the means for receiving the pre-grant message
      further comprises means for receiving an uplink
      grant comprising the SRI; and
   wherein the means for indicating whether the LBT
      procedure was successful comprises means for send-
      ing, to the base station via a physical uplink shared
      channel (PUSCH) on the second beam, a pass indi-
      cation indicating whether the LBT procedure was
      successful.

43. The apparatus of clause 42,
   wherein the means for receiving the pre-grant message
      further comprises means for receiving a transmission
      configuration of the PUSCH, the transmission con-
      figuration indicating at least one of a modulation and
      coding scheme (MCS) and a transmission resource;
      and
   wherein the means for sending, to the base station via
      the PUSCH on the second beam, the pass indication
      comprises means for sending the pass indication
      according to the transmission configuration.

44. The apparatus of clause 42 or 43, wherein the pass
   indication comprises first results of the LBT procedure.

45. The apparatus of clause 44, wherein the pass indica-
   tion further comprises second results of the measure-
   ment of the second beam requested by the base station.

46. A non-transitory computer-readable medium compris-
   ing stored computer-executable instructions for wire-
   less communication by a user equipment (UE) of a
   mobile network, executable by a processor to:
   receive, from a base station via a first beam, a pre-grant
      message requesting the UE to perform a listen-
      before-talk (LBT) procedure on a second beam;
   perform, according to the pre-grant message, the LBT
      procedure on the second beam; and
   indicate, to the base station, whether the LBT proce-
      dure was successful.

47. The non-transitory computer-readable medium of
   clause 46, wherein to receive the pre-grant message
   comprises further computer-executable instructions to:
   receive, from the base station, an indication of a
      transmission configuration indicator (TCI) state; and
   select a corresponding beam of the TCI state as the
      second beam.

48. The non-transitory computer-readable medium of
   clause 47,
   wherein to receive the pre-grant message comprises
      further computer-executable instructions to receive a
      downlink grant with reserved fields, the downlink
      grant indicating the TCI state; and
   wherein to indicate whether the LBT procedure was
      successful comprises further computer-executable
      instructions to send, to the base station via a third
      beam, a sounding reference pass indication (SRS) as
      an indication that the LBT procedure was successful.

49. The non-transitory computer-readable medium of
   clause 47 or 48,
   wherein to receive the pre-grant message further com-
      prises further computer-executable instructions to
      receive a downlink grant with reserved fields, the
      downlink grant indicating the TCI state; and
   wherein to indicate whether the LBT procedure was
      successful comprises further computer-executable
      instructions to refrain from sending, to the base
      station, a sounding reference signal (SRS) as an
      indication that the LBT procedure was not success-
      ful.

50. The non-transitory computer-readable medium of any
   of the clauses 47-49,
   wherein to receive the pre-grant message further com-
      prises further computer-executable instructions to
      receive receiving a downlink grant with reserved
      fields, the downlink grant indicating the TCI state;
      and
   wherein to indicate whether the LBT procedure was
      successful comprises further computer-executable
      instructions to send, to the base station via a physical
      uplink control channel (PUCCH) on a third beam, a
      pass indication indicating that the LBT procedure
      was successful.

51. The non-transitory computer-readable medium of any
   of the clauses 47-50,
   wherein to receive the pre-grant message further com-
      prises further computer-executable instructions to
      receive a downlink grant with reserved fields, the
      downlink grant indicating the TCI state; and
   wherein to indicate whether the LBT procedure was
      successful comprises further computer-executable
      instructions to refrain from sending, to the base
      station, a pass indication as an indication that the
      LBT procedure was not successful.

52. The non-transitory computer-readable medium of any
   of the clauses 46-51, wherein to receive the pre-grant
   message comprises further computer-executable
   instructions to:
   receive, via the first beam, a sounding reference signal
      (SRS) resource indicator (SRI) requesting a mea-
      surement of the second beam; and
   perform the measurement of the second beam.

53. The non-transitory computer-readable medium of
   clause 52,
   wherein to receive the pre-grant message further com-
      prises further computer-executable instructions to
      receive an uplink grant with reserved fields, the
      uplink grant comprising the SRI; and
   wherein to indicate whether the LBT procedure was
      successful comprises further computer-executable
      instructions to send, to the base station via a third
      beam, a sounding reference signal (SRS) as an
      indication that the LBT procedure was successful.

54. The non-transitory computer-readable medium of
   clause 52 or 53,
   wherein to receive the pre-grant message further com-
      prises further computer-executable instructions to
      receive an uplink grant with reserved fields, the
      uplink grant comprising the SRI; and
   wherein to indicate whether the LBT procedure was
      successful comprises further computer-executable
      instructions to refrain from sending, to the base
      station, a sounding reference signal (SRS) as an
      indication that the LBT procedure was not success-
      ful.

55. The non-transitory computer-readable medium of any of the clauses 52-54, wherein to receive the pre-grant message further comprises further computer-executable instructions to receive an uplink grant with reserved fields, the uplink grant comprising the SRI and a physical uplink control channel (PUCCH) resource indicator field; and wherein to indicate whether the LBT procedure was successful comprises further computer-executable instructions to send, to the base station via the PUCCH on a third beam, a pass indication indicating that the LBT procedure was successful.

56. The non-transitory computer-readable medium of any of the clauses 52-55, wherein to receive the pre-grant message further comprises further computer-executable instructions to receive an uplink grant with reserved fields, the uplink grant comprising the SRI; and wherein to indicate whether the LBT procedure was successful comprises further computer-executable instructions to refrain from sending, to the base station, a pass indication as an indication that the LBT procedure was not successful.

57. The non-transitory computer-readable medium of any of the clauses 52-56, wherein to receive the pre-grant message further comprises further computer-executable instructions to receive an uplink grant comprising the SRI; and wherein to indicate whether the LBT procedure was successful comprises further computer-executable instructions to send, to the base station via a physical uplink shared channel (PUSCH) on the second beam, a pass indication indicating whether the LBT procedure was successful.

58. The non-transitory computer-readable medium of clause 57, wherein to receive the pre-grant message further comprises further computer-executable instructions to receive a transmission configuration of the PUSCH, the transmission configuration indicating at least one of a modulation and coding scheme (MCS) and a transmission resource; and wherein to send, to the base station via the PUSCH on the second beam, the pass indication comprises further computer-executable instructions to send the pass indication according to the transmission configuration.

59. The non-transitory computer-readable medium of clause 57 or 58, wherein the pass indication comprises first results of the LBT procedure.

60. The non-transitory computer-readable medium of clause 59, wherein the pass indication further comprises second results of the measurement of the second beam requested by the base station.

61. A method of wireless communication at a base station of a mobile network, comprising:

sending, to a user equipment (UE) via a first beam, a pre-grant message requesting the UE to perform a listen-before-talk (LBT) procedure on a second beam;

obtaining, from the UE, an indication of whether the LBT procedure was successful; and sending, to the UE in response to the indication indicating that the LBT procedure being successful, downlink data via the second beam.

62. The method of clause 61, wherein sending the pre-grant message comprises:

sending, to the UE, an indication of a transmission configuration indicator (TCI) state, causing the UE to select a corresponding beam of the TCI state as the second beam.

63. The method of clause 62, wherein sending the pre-grant message further comprises sending a downlink grant with reserved fields, the downlink grant indicating the TCI state; and wherein obtaining the indication of whether the LBT procedure was successful comprises receiving, from the UE via a third beam, a sounding reference signal (SRS) as an indication that the LBT procedure was successful.

64. The method of clause 62 or 63, wherein sending the pre-grant message further comprises sending a downlink grant with reserved fields, the downlink grant indicating the TCI state; and wherein obtaining the indication of whether the LBT procedure was successful comprises determining that the UE refrained from sending a sounding reference signal (SRS) as an indication that the LBT procedure was not successful.

65. The method of any of the clauses 62-64, wherein sending the pre-grant message further comprises sending a downlink grant with reserved fields, the downlink grant indicating the TCI state; and wherein obtaining the indication of whether the LBT procedure was successful comprises receiving, from the UE via a physical uplink control channel (PUCCH) on a third beam, a pass indication indicating that the LBT procedure was successful.

66. The method of any of the clauses 62-65, wherein sending the pre-grant message further comprises sending a downlink grant with reserved fields, the downlink grant indicating the TCI state; and wherein obtaining the indication of whether the LBT procedure was successful comprises determining that the UE refrained from sending a pass indication as an indication that the LBT procedure was not successful.

67. The method of any of the clauses 61-66, wherein sending the pre-grant message comprises:

sending, via the first beam, a sounding reference signal (SRS) resource indicator (SRI) requesting a measurement of the second beam, causing the UE to perform the measurement of the second beam.

68. The method of clause 67, wherein sending the pre-grant message further comprises sending an uplink grant with reserved fields, the uplink grant comprising the SRI; and wherein obtaining the indication of whether the LBT procedure was successful comprises receiving, from the UE via a third beam, a sounding reference signal (SRS) as an indication that the LBT procedure was successful.

69. The method of clause 67 or 68, wherein sending the pre-grant message further comprises sending an uplink grant with reserved fields, the uplink grant comprising the SRI; and wherein obtaining the indication of whether the LBT procedure was successful comprises determining that the UE refrained from sending a sounding reference signal (SRS) as an indication that the LBT procedure was not successful.

70. The method of any of the clauses 67-69,
   wherein sending the pre-grant message further comprises sending an uplink grant with reserved fields, the uplink grant comprising the SRI and a physical uplink control channel (PUCCH) resource indicator field; and
   wherein obtaining the indication of whether the LBT procedure was successful comprises receiving, from the UE via the PUCCH on a third beam, a pass indication indicating that the LBT procedure was successful.

71. The method of any of the clauses 67-70,
   wherein sending the pre-grant message further comprises sending an uplink grant with reserved fields, the uplink grant comprising the SRI; and
   wherein obtaining the indication of whether the LBT procedure was successful comprises determining that the UE refrained from sending a pass indication as an indication that the LBT procedure was not successful.

72. The method of any of the clauses 67-71,
   wherein sending the pre-grant message further comprises sending an uplink grant comprising the SRI; and
   wherein obtaining the indication of whether the LBT procedure was successful comprises receiving, from the UE via a physical uplink shared channel (PUSCH) on the second beam, a pass indication indicating whether the LBT procedure was successful.

73. The method of clause 72,
   wherein sending the pre-grant message further comprises sending a transmission configuration of the PUSCH, the transmission configuration indicating at least one of a modulation and coding scheme (MCS) and a transmission resource; and
   wherein receiving, from the UE via the PUSCH on the second beam, the pass indication comprises receiving the pass indication according to the transmission configuration.

74. The method of clause 72 or 73, wherein the pass indication comprises first results of the LBT procedure.

75. The method of clause 74, wherein the pass indication further comprises second results of the measurement of the second beam requested by the base station.

76. An apparatus of wireless communication at a base station of a mobile network, comprising:
   a non-transitory memory storing computer-executable instructions; and
   a processor communicatively coupled with the non-transitory memory and configured to execute the computer-executable instructions to:
   send, to a user equipment (UE) via a first beam, a pre-grant message requesting the UE to perform a listen-before-talk (LBT) procedure on a second beam;
   obtain, from the UE, an indication of whether the LBT procedure was successful; and
   send, to the UE in response to the indication indicating that the LBT procedure being successful, downlink data via the second beam.

77. The apparatus of clause 76, wherein to send the pre-grant message comprises further computer-executable instructions to:

send, to the UE, an indication of a transmission configuration indicator (TCI) state, causing the UE to select a corresponding beam of the TCI state as the second beam.

78. The apparatus of clause 77,
   wherein to send the pre-grant message further comprises further computer-executable instructions to send a downlink grant with reserved fields, the downlink grant indicating the TCI state; and
   wherein to obtain the indication of whether the LBT procedure was successful comprises further computer-executable instructions to receive, from the UE via a third beam, a sounding reference signal (SRS) as an indication that the LBT procedure was successful.

79. The apparatus of clause 77 or 78,
   wherein to send the pre-grant message further comprises further computer-executable instructions to send a downlink grant with reserved fields, the downlink grant indicating the TCI state; and
   wherein to obtain the indication of whether the LBT procedure was successful comprises further computer-executable instructions to determine that the UE refrained from sending a sounding reference signal (SRS) as an indication that the LBT procedure was not successful.

80. The apparatus of any of the clauses 77-79,
   wherein to send the pre-grant message further comprises further computer-executable instructions to send a downlink grant with reserved fields, the downlink grant indicating the TCI state; and
   wherein to obtain the indication of whether the LBT procedure was successful comprises further computer-executable instructions to receive, from the UE via a physical uplink control channel (PUCCH) on a third beam, a pass indication indicating that the LBT procedure was successful.

81. The apparatus of any of the clauses 77-80,
   wherein to send the pre-grant message further comprises further computer-executable instructions to send a downlink grant with reserved fields, the downlink grant indicating the TCI state; and
   wherein to obtain the indication of whether the LBT procedure was successful comprises further computer-executable instructions to determine that the UE refrained from sending a pass indication as an indication that the LBT procedure was not successful.

82. The apparatus of any of the clauses 76-81, wherein to send the pre-grant message comprises further computer-executable instructions to:
   send, via the first beam, a sounding reference signal (SRS) resource indicator (SRI) requesting a measurement of the second beam, causing the UE to perform the measurement of the second beam.

83. The apparatus of clause 82,
   wherein to send the pre-grant message comprises further computer-executable instructions to send an uplink grant with reserved fields, the uplink grant comprising the SRI; and
   wherein to obtain the indication of whether the LBT procedure was successful comprises further computer-executable instructions to receive, from the UE via a third beam, a sounding reference signal (SRS) as an indication that the LBT procedure was successful.

84. The apparatus of clause 82 or 83, wherein to send the pre-grant message further comprises further computer-executable instructions to send an uplink grant with reserved fields, the uplink grant comprising the SRI; and wherein to obtain the indication of whether the LBT procedure was successful comprises further computer-executable instructions to determine that the UE refrained from sending a sounding reference signal (SRS) as an indication that the LBT procedure was not successful.

85. The apparatus of any of the clauses 82-84, wherein to send the pre-grant message further comprises further computer-executable instructions to send an uplink grant with reserved fields, the uplink grant comprising the SRI and a physical uplink control channel (PUCCH) resource indicator field; and wherein to obtain the indication of whether the LBT procedure was successful comprises further computer-executable instructions to receive, from the UE via the PUCCH on a third beam, a pass indication indicating that the LBT procedure was successful.

86. The apparatus of any of the clauses 82-85, wherein to send the pre-grant message further comprises further computer-executable instructions to send an uplink grant with reserved fields, the uplink grant comprising the SRI; and wherein to obtain the indication of whether the LBT procedure was successful comprises further computer-executable instructions to determine that the UE refrained from sending a pass indication as an indication that the LBT procedure was not successful.

87. The apparatus of any of the clauses 82-86, wherein to send the pre-grant message further comprises further computer-executable instructions to send an uplink grant comprising the SRI; and wherein to obtain the indication of whether the LBT procedure was successful comprises further computer-executable instructions to receive, from the UE via a physical uplink shared channel (PUSCH) on the second beam, a pass indication indicating whether the LBT procedure was successful.

88. The apparatus of clause 87, wherein to send the pre-grant message further comprises further computer-executable instructions to send a transmission configuration of the PUSCH, the transmission configuration indicating at least one of a modulation and coding scheme (MCS) and a transmission resource; and wherein to receive, from the UE via the PUSCH on the second beam, the pass indication comprises further computer-executable instructions to receive the pass indication according to the transmission configuration.

89. The apparatus of clause 87 or 88, wherein the pass indication comprises first results of the LBT procedure.

90. The apparatus of clause 89, wherein the pass indication further comprises second results of the measurement of the second beam requested by the base station.

91. An apparatus of wireless communication at a base station of a mobile network, comprising:

means for sending, to a user equipment (UE) via a first beam, a pre-grant message requesting the UE to perform a listen-before-talk (LBT) procedure on a second beam;

means for obtaining, from the UE, an indication of whether the LBT procedure was successful; and means for sending, to the UE in response to the indication indicating that the LBT procedure being successful, downlink data via the second beam.

92. The apparatus of clause 91, wherein the means for sending the pre-grant message comprises:

means for sending, to the UE, an indication of a transmission configuration indicator (TCI) state, causing the UE to select a corresponding beam of the TCI state as the second beam.

93. The apparatus of clause 92, wherein the means for sending the pre-grant message further comprises means for sending a downlink grant with reserved fields, the downlink grant indicating the TCI state; and wherein the means for obtaining the indication of whether the LBT procedure was successful comprises means for receiving, from the UE via a third beam, a sounding reference signal (SRS) as an indication that the LBT procedure was successful.

94. The apparatus of clause 92 or 93, wherein the means for sending the pre-grant message further comprises means for sending a downlink grant with reserved fields, the downlink grant indicating the TCI state; and wherein the means for obtaining the indication of whether the LBT procedure was successful comprises means for determining that the UE refrained from sending a sounding reference signal (SRS) as an indication that the LBT procedure was not successful.

95. The apparatus of any of the clauses 92-94, wherein the means for sending the pre-grant message further comprises means for sending a downlink grant with reserved fields, the downlink grant indicating the TCI state; and wherein the means for obtaining the indication of whether the LBT procedure was successful comprises receiving, from the UE via a physical uplink control channel (PUCCH) on a third beam, a pass indication indicating that the LBT procedure was successful.

96. The apparatus of any of the clauses 92-95, wherein the means for sending the pre-grant message further comprises means for sending a downlink grant with reserved fields, the downlink grant indicating the TCI state; and wherein the means for obtaining the indication of whether the LBT procedure was successful comprises means for determining that the UE refrained from sending a pass indication as an indication that the LBT procedure was not successful.

97. The apparatus of any of the clauses 91-96, wherein the means for sending the pre-grant message comprises:

sending, via the first beam, a sounding reference signal (SRS) resource indicator (SRI) requesting a measurement of the second beam, causing the UE to perform the measurement of the second beam.

98. The apparatus of clause 97, wherein the means for sending the pre-grant message further comprises means for sending an uplink grant with reserved fields, the uplink grant comprising the SRI; and wherein the means for obtaining the indication of whether the LBT procedure was successful comprises receiving, from the UE via a third beam, a sounding reference signal (SRS) as an indication that the LBT procedure was successful.

99. The apparatus of clause 97 or 98,
wherein the means for sending the pre-grant message further comprises means for sending an uplink grant with reserved fields, the uplink grant comprising the SRI; and
wherein the means for obtaining the indication of whether the LBT procedure was successful comprises means for determining that the UE refrained from sending a sounding reference signal (SRS) as an indication that the LBT procedure was not successful.

100. The apparatus of any of the clauses 97-99,
wherein the means for sending the pre-grant message further comprises means for sending an uplink grant with reserved fields, the uplink grant comprising the SRI and a physical uplink control channel (PUCCH) resource indicator field; and
wherein the means for obtaining the indication of whether the LBT procedure was successful comprises receiving, from the UE via the PUCCH on a third beam, a pass indication indicating that the LBT procedure was successful.

101. The apparatus of any of the clauses 97-100,
wherein the means for sending the pre-grant message further comprises means for sending an uplink grant with reserved fields, the uplink grant comprising the SRI; and
wherein the means for obtaining the indication of whether the LBT procedure was successful comprises means for determining that the UE refrained from sending a pass indication as an indication that the LBT procedure was not successful.

102. The apparatus of any of the clauses 97-101,
wherein the means for sending the pre-grant message further comprises means for sending an uplink grant comprising the SRI; and
wherein the means for obtaining the indication of whether the LBT procedure was successful comprises means for receiving, from the UE via a physical uplink shared channel (PUSCH) on the second beam, a pass indication indicating whether the LBT procedure was successful.

103. The apparatus of clause 102,
wherein the means for sending the pre-grant message further comprises means for sending a transmission configuration of the PUSCH, the transmission configuration indicating at least one of a modulation and coding scheme (MCS) and a transmission resource; and
wherein the means for receiving, from the UE via the PUSCH on the second beam, the pass indication comprises means for receiving the pass indication according to the transmission configuration.

104. The apparatus of clause 102 or 103, wherein the pass indication comprises first results of the LBT procedure.

105. The apparatus of clause 104, wherein the pass indication further comprises second results of the measurement of the second beam requested by the base station.

106. A non-transitory computer-readable medium comprising stored computer-executable instructions for wireless communication by a base station of a mobile network, executable by a processor to:

send, to a user equipment (UE) via a first beam, a pre-grant message requesting the UE to perform a listen-before-talk (LBT) procedure on a second beam;
obtain, from the UE, an indication of whether the LBT procedure was successful; and
send, to the UE in response to the indication indicating that the LBT procedure being successful, downlink data via the second beam.

107. The non-transitory computer-readable medium of clause 106, wherein to send the pre-grant message comprises further computer-executable instructions to:
send, to the UE, an indication of a transmission configuration indicator (TCI) state, causing the UE to select a corresponding beam of the TCI state as the second beam.

108. The non-transitory computer-readable medium of clause 107,
wherein to send the pre-grant message further comprises further computer-executable instructions to send a downlink grant with reserved fields, the downlink grant indicating the TCI state; and
wherein to obtain the indication of whether the LBT procedure was successful comprises further computer-executable instructions to receive, from the UE via a third beam, a sounding reference signal (SRS) as an indication that the LBT procedure was successful.

109. The non-transitory computer-readable medium of clause 107 or 108,
wherein to send the pre-grant message further comprises further computer-executable instructions to send a downlink grant with reserved fields, the downlink grant indicating the TCI state; and
wherein to obtain the indication of whether the LBT procedure was successful comprises further computer-executable instructions to determine that the UE refrained from sending a sounding reference signal (SRS) as an indication that the LBT procedure was not successful.

110. The non-transitory computer-readable medium of any of the clauses 107-109,
wherein to send the pre-grant message further comprises further computer-executable instructions to send a downlink grant with reserved fields, the downlink grant indicating the TCI state; and
wherein to obtain the indication of whether the LBT procedure was successful comprises further computer-executable instructions to receive, from the UE via a physical uplink control channel (PUCCH) on a third beam, a pass indication indicating that the LBT procedure was successful.

111. The non-transitory computer-readable medium of any of the clauses 107-110,
wherein to send the pre-grant message further comprises further computer-executable instructions to send a downlink grant with reserved fields, the downlink grant indicating the TCI state; and
wherein to obtain the indication of whether the LBT procedure was successful comprises further computer-executable instructions to determine that the UE refrained from sending a pass indication as an indication that the LBT procedure was not successful.

112. The non-transitory computer-readable medium of any of the clauses 106-111, wherein to send the pre-grant message comprises:

sending, via the first beam, a sounding reference signal (SRS) resource indicator (SRI) requesting a measurement of the second beam, causing the UE to perform the measurement of the second beam.

113. The non-transitory computer-readable medium of clause 112, wherein to send the pre-grant message comprises further computer-executable instructions to send an uplink grant with reserved fields, the uplink grant comprising the SRI; and wherein to obtain the indication of whether the LBT procedure was successful comprises further computer-executable instructions to receive, from the UE via a third beam, a sounding reference signal (SRS) as an indication that the LBT procedure was successful.

114. The non-transitory computer-readable medium of clause 112 or 113, wherein to send the pre-grant message further comprises further computer-executable instructions to send an uplink grant with reserved fields, the uplink grant comprising the SRI; and wherein to obtain the indication of whether the LBT procedure was successful comprises further computer-executable instructions to determine that the UE refrained from sending a sounding reference signal (SRS) as an indication that the LBT procedure was not successful.

115. The non-transitory computer-readable medium of any of the clauses 112-114, wherein to send the pre-grant message further comprises further computer-executable instructions to send an uplink grant with reserved fields, the uplink grant comprising the SRI and a physical uplink control channel (PUCCH) resource indicator field; and wherein to obtain the indication of whether the LBT procedure was successful comprises further computer-executable instructions to receive, from the UE via the PUCCH on a third beam, a pass indication indicating that the LBT procedure was successful.

116. The non-transitory computer-readable medium of any of the clauses 112-115, wherein to send the pre-grant message further comprises further computer-executable instructions to send an uplink grant with reserved fields, the uplink grant comprising the SRI; and wherein to obtain the indication of whether the LBT procedure was successful comprises further computer-executable instructions to determine that the UE refrained from sending a pass indication as an indication that the LBT procedure was not successful.

117. The non-transitory computer-readable medium of any of the clauses 112-116, wherein to send the pre-grant message further comprises further computer-executable instructions to send an uplink grant comprising the SRI; and wherein to obtain the indication of whether the LBT procedure was successful comprises further computer-executable instructions to receive, from the UE via a physical uplink shared channel (PUSCH) on the second beam, a pass indication indicating whether the LBT procedure was successful.

118. The non-transitory computer-readable medium of clause 117, wherein to send the pre-grant message further comprises further computer-executable instructions to send a transmission configuration of the PUSCH, the transmission configuration indicating at least one of a modulation and coding scheme (MCS) and a transmission resource; and wherein to receive, from the UE via the PUSCH on the second beam, the pass indication comprises further computer-executable instructions to receive the pass indication according to the transmission configuration.

119. The non-transitory computer-readable medium of clause 117 or 118, wherein the pass indication comprises first results of the LBT procedure.

120. The non-transitory computer-readable medium of clause 119, wherein the pass indication further comprises second results of the measurement of the second beam requested by the base station.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE) of a mobile network, comprising:

receiving, from a base station via a first beam, a pre-grant message requesting the UE to perform a listen-before-talk (LBT) procedure on a second beam;

performing, according to the pre-grant message, the LBT procedure on the second beam; and indicating, to the base station, whether the LBT procedure was successful.

2. An apparatus of wireless communication at a user equipment (UE) of a mobile network, comprising:

a non-transitory memory storing computer-executable instructions; and a processor communicatively coupled with the non-transitory memory and configured to execute the computer-executable instructions to:

receive, from a base station via a first beam, a pre-grant message requesting the UE to perform a listen-before-talk (LBT) procedure on a second beam;

perform, according to the pre-grant message, the LBT procedure on the second beam; and indicate, to the base station, whether the LBT procedure was successful.

3. The apparatus of claim 2, wherein to receive the pre-grant message comprises further computer-executable instructions to:

receive, from the base station, an indication of a transmission configuration indicator (TCI) state; and select a corresponding beam of the TCI state as the second beam.

4. The apparatus of claim 3, wherein to receive the pre-grant message comprises further computer-executable instructions to receive a downlink grant with reserved fields, the downlink grant indicating the TCI state; and wherein to indicate whether the LBT procedure was successful comprises further computer-executable instructions to send, to the base station via a third beam, a sounding reference signal (SRS) as an indication that the LBT procedure was successful.

5. The apparatus of claim 3, wherein to receive the pre-grant message further comprises further computer-executable instructions to receive a downlink grant with reserved fields, the downlink grant indicating the TCI state; and wherein to indicate whether the LBT procedure was successful comprises further computer-executable instructions to refrain from sending, to the base station, a sounding reference signal (SRS) as an indication that the LBT procedure was not successful.

6. The apparatus of claim 3, wherein to receive the pre-grant message further comprises further computer-executable instructions to receive receiving a downlink grant with reserved fields, the downlink grant indicating the TCI state; and wherein to indicate whether the LBT procedure was successful comprises further computer-executable instructions to send, to the base station via a physical uplink control channel (PUCCH) on a third beam, a pass indication indicating that the LBT procedure was successful.

7. The apparatus of claim 2, wherein to receive the pre-grant message comprises further computer-executable instructions to:

receive, via the first beam, a sounding reference signal (SRS) resource indicator (SRI) requesting a measurement of the second beam; and perform the measurement of the second beam.

8. The apparatus of claim 7, wherein to receive the pre-grant message further comprises further computer-executable instructions to receive an uplink grant with reserved fields, the uplink grant comprising the SRI; and wherein to indicate whether the LBT procedure was successful comprises further computer-executable instructions to send, to the base station via a third beam, a sounding reference signal (SRS) as an indication that the LBT procedure was successful.

9. The apparatus of claim 7, wherein to receive the pre-grant message further comprises further computer-executable instructions to receive an uplink grant with reserved fields, the uplink grant comprising the SRI and a physical uplink control channel (PUCCH) resource indicator field; and wherein to indicate whether the LBT procedure was successful comprises further computer-executable instructions to send, to the base station via the PUCCH on a third beam, a pass indication indicating that the LBT procedure was successful.

10. The apparatus of claim 7, wherein to receive the pre-grant message further comprises further computer-executable instructions to receive an uplink grant comprising the SRI; and wherein to indicate whether the LBT procedure was successful comprises further computer-executable instructions to send, to the base station via a physical uplink shared channel (PUSCH) on the second beam, a pass indication indicating whether the LBT procedure was successful.

11. The apparatus of claim 10, wherein to receive the pre-grant message further comprises further computer-executable instructions to receive a transmission configuration of the PUSCH, the transmission configuration indicating at least one of a modulation and coding scheme (MCS) and a transmission resource; and wherein to send, to the base station via the PUSCH on the second beam, the pass indication comprises further computer-executable instructions to send the pass indication according to the transmission configuration.

12. An apparatus of wireless communication at a base station of a mobile network, comprising:

a non-transitory memory storing computer-executable instructions; and a processor communicatively coupled with the non-transitory memory and configured to execute the computer-executable instructions to:

send, to a user equipment (UE) via a first beam, a pre-grant message requesting the UE to perform a listen-before-talk (LBT) procedure on a second beam;

obtain, from the UE, an indication of whether the LBT procedure was successful; and send, to the UE in response to the indication indicating that the LBT procedure being successful, downlink data via the second beam.

13. The apparatus of claim 12, wherein to send the pre-grant message comprises further computer-executable instructions to:

send, to the UE, an indication of a transmission configuration indicator (TCI) state, causing the UE to select a corresponding beam of the TCI state as the second beam.

14. The apparatus of claim 13, wherein to send the pre-grant message further comprises further computer-executable instructions to send a downlink grant with reserved fields, the downlink grant indicating the TCI state; and wherein to obtain the indication of whether the LBT procedure was successful comprises further computer-executable instructions to receive, from the UE via a third beam, a sounding reference signal (SRS) as an indication that the LBT procedure was successful.

15. The apparatus of claim 13, wherein to send the pre-grant message further comprises further computer-executable instructions to send a downlink grant with reserved fields, the downlink grant indicating the TCI state; and wherein to obtain the indication of whether the LBT procedure was successful comprises further computer-executable instructions to receive, from the UE via a physical uplink control channel (PUCCH) on a third beam, a pass indication indicating that the LBT procedure was successful.

16. The apparatus of claim 12, wherein to send the pre-grant message comprises further computer-executable instructions to:

send, via the first beam, a sounding reference signal (SRS) resource indicator (SRI) requesting a measurement of the second beam, causing the UE to perform the measurement of the second beam.

17. The apparatus of claim 16, wherein to send the pre-grant message comprises further computer-executable instructions to send an uplink grant with reserved fields, the uplink grant comprising the SRI; and wherein to obtain the indication of whether the LBT procedure was successful comprises further computer-executable instructions to receive, from the UE via a third beam, a sounding reference signal (SRS) as an indication that the LBT procedure was successful.

18. The apparatus of claim 16, wherein to send the pre-grant message further comprises further computer-executable instructions to send an uplink grant with reserved fields, the uplink grant comprising the SRI and a physical uplink control channel (PUCCH) resource indicator field; and wherein to obtain the indication of whether the LBT procedure was successful comprises further computer-executable instructions to receive, from the UE via the PUCCH on a third beam, a pass indication indicating that the LBT procedure was successful.

19. The apparatus of claim 16, wherein to send the pre-grant message further comprises further computer-executable instructions to send an uplink grant comprising the SRI; and wherein to obtain the indication of whether the LBT procedure was successful comprises further computer-executable instructions to receive, from the UE via a physical uplink shared channel (PUSCH) on the second beam, a pass indication indicating whether the LBT procedure was successful.

20. The apparatus of claim 19, wherein to send the pre-grant message further comprises further computer-executable instructions to send a transmission configuration of the PUSCH, the transmission configuration indicating at least one of a modulation and coding scheme (MCS) and a transmission resource; and wherein to receive, from the UE via the PUSCH on the second beam, the pass indication comprises further computer-executable instructions to receive the pass indication according to the transmission configuration.

* * * * *